US012712373B2

(12) United States Patent
Abu-Hussain

(10) Patent No.: US 12,712,373 B2
(45) Date of Patent: Aug. 18, 2026

(54) FULLY AUTOMATED BATTERY SWAPPING FOR MOBILE DEVICE EXTERNAL BATTERIES

(71) Applicant: Swapery Trading W.L.L., Doha (QA)

(72) Inventor: Ali Salah J M Abu-Hussain, Doha (QA)

(73) Assignee: SWAPERY TRADING W.L.L., Doha (QA)

( * ) Notice: Subject to any disclaimer, the term of this patent is extended or adjusted under 35 U.S.C. 154(b) by 720 days.

(21) Appl. No.: 18/130,058

(22) Filed: Apr. 3, 2023

(65) Prior Publication Data

US 2023/0318328 A1 Oct. 5, 2023

Related U.S. Application Data

(60) Provisional application No. 63/327,153, filed on Apr. 4, 2022.

(51) Int. Cl.

*H02J 7/70* (2026.01)
*B60L 53/80* (2019.01)
*B60S 5/06* (2019.01)
*H01F 7/08* (2006.01)

(52) U.S. Cl.

CPC .............. *H02J 7/731* (2026.01); *B60L 53/80* (2019.02); *B60S 5/06* (2013.01); *H01F 7/08* (2013.01)

(58) Field of Classification Search

CPC . H02J 7/731; H02J 7/0044; B60S 5/06; B60L 53/80

See application file for complete search history.

(56) References Cited

U.S. PATENT DOCUMENTS

2019/0342433 A1* 11/2019 Romain .............. H04M 1/0262

FOREIGN PATENT DOCUMENTS

| | | | | |
|---|---|---|---|---|
| CN | 110626192 A | * 12/2019 | | B60L 53/36 |
| WO | 2019114546 A1 | 6/2019 | | |
| WO | 2020262630 A1 | 12/2020 | | |

OTHER PUBLICATIONS

International Preliminary Report on Patentability for related International Application No. PCT/QA2023/050001; action dated Oct. 17, 2024; (8 pages).
International Search Report for related International Application No. PCT/QA2023/050001; action dated Oct. 12, 2023; (3 pages).
Written Opinion for related International Application No. PCT/QA2023/050001; action dated Oct. 12, 2023; (6 pages).

* cited by examiner

*Primary Examiner* — David V Henze
(74) *Attorney, Agent, or Firm* — K&L Gates LLP

(57) ABSTRACT

Fully automated battery swapping for mobile device external batteries may be provided by aligning a first slot of a plurality of slots in a battery carrier unit with an aperture of a battery swapping system, wherein the battery carrier unit holds at least one charged external battery in a corresponding at least one of the plurality of slots, wherein the first slot does not presently hold an external battery; receiving a depleted external battery from a battery housing attachment of a mobile device into the first slot via the aperture; aligning a second slot of the plurality of slots with the aperture, wherein the second slot holds a charged external battery; and traversing an extractor flange through the second slot to push the charged external battery out of the second slot, through the aperture, and into the battery housing attachment.

15 Claims, 27 Drawing Sheets

FULLY AUTOMATED BATTERY SWAPPING FOR MOBILE DEVICE EXTERNAL BATTERIES

CROSS-REFERENCES TO RELATED APPLICATIONS

The present disclosure claims priority to U.S. Provisional Patent Application 63/327,153 titled "FULLY AUTOMATED BATTERY SWAPPING SYSTEM FOR MOBILE DEVICE EXTERNAL BATTERY AND METHOD OF USING SAME" and filed on Apr. 4, 2022 which is incorporated by reference herein in its entirety.

BACKGROUND

Mobile devices, such as cellular phones, tablets and e-readers, have become essential to every aspect of modern-day life. From communicating with others, conducting business, to leisure activities such as playing video games, the prevalence and vast functionality of mobile devices have allowed these devices to become one of the most useful instruments to navigate modern society. However, the usefulness of mobile devices is directly related to the duration of the battery charge within the mobile device. Without any battery life, the mobile device is rendered useless. Additionally, with some mobile devices, functionality becomes either impaired or drops off as the battery life becomes more depleted. Depending on the sophistication of the mobile device and the type of battery used, the duration of battery life can vary greatly. However, irrespective of the type of battery or specific mobile device, all mobile device batteries become depleted and need to be recharged at some point in time.

The process of having to charge a mobile device can be inconvenient to the device user because the process creates usage downtime, which is the amount of time that the user is without full functionality and or the ability to freely move with the device. Additionally, having to charge a mobile device can be restrictive because, if the user of the mobile device would still like to use the device while the device is charging, the user is spatially restricted and must use the device within a distance as far as the charging cable will reach from the power source (e.g., an outlet) to the device; the once-mobile device becomes significantly less mobile when charging is necessary. Usage downtime is not only inconvenient, this downtime can lead to a reduction in productivity and impedes enjoyment of the mobile device. Furthermore, users often forget to charge their mobile devices.

Currently available systems that attempt to reduce usage downtime of mobile devices due to the need to recharge the device have several drawbacks. For example, an external battery or "power pack" is a currently available system that attempts to reduce the usage downtime of a mobile device by constantly recharging the internal battery of the device. However, external batteries are bulky and require additional cables to connect with a mobile device, which can be cumbersome and inconvenient to carry around. Furthermore, a user of a mobile device and an external power pack must remember to charge two devices, which adds downtime and effort to the process, rather than worrying about only charging one mobile device. Additionally, each time a power pack is used, the user has to secure two cables to charge both the mobile device and the power pack, which is inconvenient and requires time and effort.

Another class of currently available systems to reduce usage downtime are mobile device cases with integrated external batteries. Existing mobile device cases with integrated external batteries have several drawbacks such as being bulky and inconvenient to carry. More significantly, existing mobile device cases with integrated external batteries do not resolve the usage downtime issue because the external battery within the case also must be charged, just like the internal battery of the mobile device. Because the integrated battery in the case requires downtime to be recharged, the user of the mobile device is unable to freely use the mobile device. Therefore, existing mobile device cases with integrated external batteries do not resolve the usage downtime issue and worse, add to the amount of usage downtime experienced by the user of that system.

Accordingly, a convenient system and method for reducing the amount of usage downtime of mobile devices that results from having to charge the mobile devices is desired. Additionally, a simplified and convenient system and method for utilizing an external battery to charge the internal battery of a mobile device without usage downtime to charge the external battery is also desirable.

SUMMARY

Generally, the present disclosure provides a new and innovative system for automatically swapping an external battery used by a mobile device. Additionally, the present disclosure provides a method of using the automatic external battery swapping system. The systems and methods of the present disclosure provide a reduction of the usage downtime a user of a mobile device experiences due to the mobile device having to be charged when the internal battery depleting.

To this end, in an embodiment, a battery swapping system for a mobile device on which a battery housing attachment is disposed and secures an external battery to the mobile device, is provided, the system comprising: a housing, including an aperture that allows passage between an outside of the housing and an inside of the housing; a receiving assembly, configured to position the battery housing attachment at a predefined distance relative to the aperture when the mobile device is inserted into the receiving assembly; a battery carrier unit, disposed in the inside of the housing, including a plurality of slots configured to hold a corresponding plurality of external batteries, and a terminal panel configured to pass an electric charge from an electrical power supply to at least one external battery of a plurality of external batteries held within the plurality of slots; a first traversing stage configured to travel on a first axis and connected to the battery carrier unit to thereby align individual slots of the plurality of slots with the aperture; a second traversing stage configured to travel on a second axis, perpendicular to the first axis, the second traversing stage including an extractor flange configured for insertion through an individual slot of the plurality of slots, wherein in a first position the extractor flange is out of contact with any external batteries and in a second position, at an opposite end of travel on the second axis relative to the first position, the extractor flange extends an affixed battery into contact with the battery housing attachment; and a controller, configured to signal the first traversing stage and the second traversing stage to: align a first slot of the plurality of slots that does not presently hold any external batteries of the plurality of external batteries with the aperture when receiving a depleted external battery from the mobile device; align a second slot of the plurality of slots that holds a charged external battery with aperture; and traverse the extractor flange through the second slot to push the charged external battery out of the second slot, through the aperture, and into the battery housing attachment.

In some embodiments of the system, as described above or below, the system is further comprising: a first solenoid and a second solenoid configured to move between a first position and a second position, wherein in the first position the first solenoid and the second solenoid apply an inward force to corresponding ones of a first side arm of the receiving assembly and a second side arm of the receiving assembly that respectively push a first tab and a second tab of the external battery out of a first tab-lock and a second tab-lock of the battery housing attachment, and wherein in the second position the first solenoid and the second solenoid release the inward force from the first side arm and the second side arm to allow the tabs of the charged external battery to engage the first tab-lock and the second tab-lock when inserted into the battery housing attachment.

In some embodiments of the system, as described above or below, the controller is further configured to, after aligning the first slot with the aperture, and before aligning the second slot with the aperture: extending the extractor flange through the first slot; release the depleted external battery from the battery housing attachment; retract the extractor flange through the first slot with the depleted external battery affixed with the extractor flange; and secure the depleted external battery into the first slot.

In some embodiments of the system, as described above or below, the controller is further configured to: select the charged external battery from a plurality of charged external batteries held in the battery carrier unit based on one or more of: relative charge states of the plurality of charged external batteries; and relative durations of holding of the plurality of charged external batteries in the battery carrier unit.

In some embodiments of the system, as described above or below, each slot of the plurality of slots includes an first opening on a first side of the battery carrier unit that is larger than a second opening on a second side of the battery carrier unit, opposite to the first side, wherein the first side is closer to the aperture than the second side is, and a traversal hole running between the first opening and the second opening on a third side of the battery carrier unit perpendicular to the first side and the second side.

In some embodiments of the system, as described above or below, the system is further comprising: sensors configured to detect when a mobile device is received by the receiving assembly.

To this end, in an embodiment, a method is provided, the method comprising: aligning a first slot of a plurality of slots in a battery carrier unit with an aperture of a battery swapping system, wherein the battery carrier unit holds at least one charged external battery in a corresponding at least one of the plurality of slots, wherein the first slot does not presently hold an external battery; receiving a depleted external battery from a battery housing attachment of a mobile device into the first slot via the aperture; aligning a second slot of the plurality of slots with the aperture, wherein the second slot holds a charged external battery; and traversing an extractor flange through the second slot to push the charged external battery out of the second slot, through the aperture, and into the battery housing attachment.

In some embodiments of the method, as described above or below, the second slot is selected from the plurality of slots based on one or more of: a relative charge state of the at least one charged external battery held in the plurality of slots; and a relative time of holding in the battery carrier unit of the at least one charged external battery held in the plurality of slots.

In some embodiments of the method, as described above or below, the method is further comprising: extending the extractor flange through the first slot when aligned with the aperture; releasing the depleted external battery from the battery housing attachment; and wherein receiving the depleted external battery further comprises: retracting the extractor flange through the first slot with the depleted external battery affixed with the extractor flange; and securing the depleted external battery into the first slot.

In some embodiments of the method, as described above or below, releasing the depleted external battery includes actuating solenoid heads to engage locking mechanisms of the battery housing attachment.

In some embodiments of the method, as described above or below, the first slot is aligned with the aperture in response to receiving the mobile device in a receiving assembly of the system.

In some embodiments of the method, as described above or below, the method is further comprising: charging the depleted external battery after receiving the depleted external battery into the battery carrier unit.

To this end, in an embodiment, a computer readable storage medium including instructions that when executed by a processor perform operations via a battery swapping system that includes a battery carrier unit with a plurality of slots that is movable via a first traversing stage relative to an aperture in the battery swapping system and includes a second traversing stage, the operations comprising: aligning a first slot of the plurality of slots with the aperture via the first traversing stage, wherein the battery carrier unit holds at least one charged external battery in a corresponding at least one of the plurality of slots, wherein the first slot does not presently hold an external battery; receiving, into the first slot via the aperture, a depleted external battery from a battery housing attachment of a mobile device received by the battery swapping system; aligning, via the first traversing stage, a second slot of the plurality of slots with the aperture, wherein the second slot holds a charged external battery; and traversing, via the second traversing stage, an extractor flange through the second slot to push the charged external battery out of the second slot, through the aperture, and into the battery housing attachment.

In some embodiments of the computer readable storage medium, as described above or below, the second slot is selected from the plurality of slots based on one or more of: a relative charge state of the at least one charged external battery held in the plurality of slots; and a relative time of holding in the battery carrier unit of the at least one charged external battery held in the plurality of slots.

In some embodiments of the computer readable storage medium, as described above or below, the operations further comprising: extending the extractor flange through the first slot when aligned with the aperture; releasing the depleted external battery from the battery housing attachment; and wherein receiving the depleted external battery further comprises: retracting the extractor flange through the first slot with the depleted external battery affixed with the extractor flange; and securing the depleted external battery into the first slot.

The system of the present disclosure also includes, in an embodiment, a base unit. The base unit is configured to automatically swap an external battery located within the mobile device battery housing attachment of a mobile device with a fully charged external battery selected from a plurality of fully charged external batteries within the base unit. In doing so, the base unit includes a mobile device receiving assembly to facilitate the reversible association between the base unit and the mobile device. The base unit is configured to receive a depleted external battery and swap the depleted external battery out for a fully charged external battery. For example, mechanical means are provided to facilitate the horizontal and vertical movements of the external battery during the swapping process. Finally, the base unit includes control boards, controllers and sensors to facilitate the swapping of external batteries through coordinating the mechanical components of the base unit.

It has been shown that, reducing the amount of mobile device user downtime due to the need to charge the mobile device increases productivity and overall convenience to the mobile device user. An additional benefit of the provided system includes eliminating the need for bulky and inconvenient external batteries that require charging cables and extensive downtime to charge the external battery itself and not to forget to charge it each time. The provided system eliminates all the steps and process of securing a fully charged external battery and turns the process into one simple step.

The present disclosure allows for the automatic, convenient and rapid swapping of a depleted external battery from a mobile device with a fully charged external battery from a base unit which eliminates mobile device usage downtime and allows for continuous use of a mobile device without the need to cease using the mobile device to allow the device to charge and eliminates the need to remember to charge mobile device or any other external battery.

BRIEF DESCRIPTION OF THE FIGURES

The present disclosure will become fully understood from the detailed description given herein below for illustration only and thus does not limit the present disclosure, wherein.

DETAILED DESCRIPTION

The present disclosure provides new and innovative systems and methods for automatically swapping an external battery used by a mobile device. The provided systems and methods enable the user of a mobile device to continuously use the mobile device without any usage downtime due to having to recharge the mobile device. The automatic swapping method consists of three phases. First, a base unit receives a mobile device. Second, a depleted external battery is removed from the mobile device and received within the base unit to be recharged. Third, a fully charged external battery is installed into the mobile device. The system and method for performing these three phases are explained in detail herein.

Figure 1A:
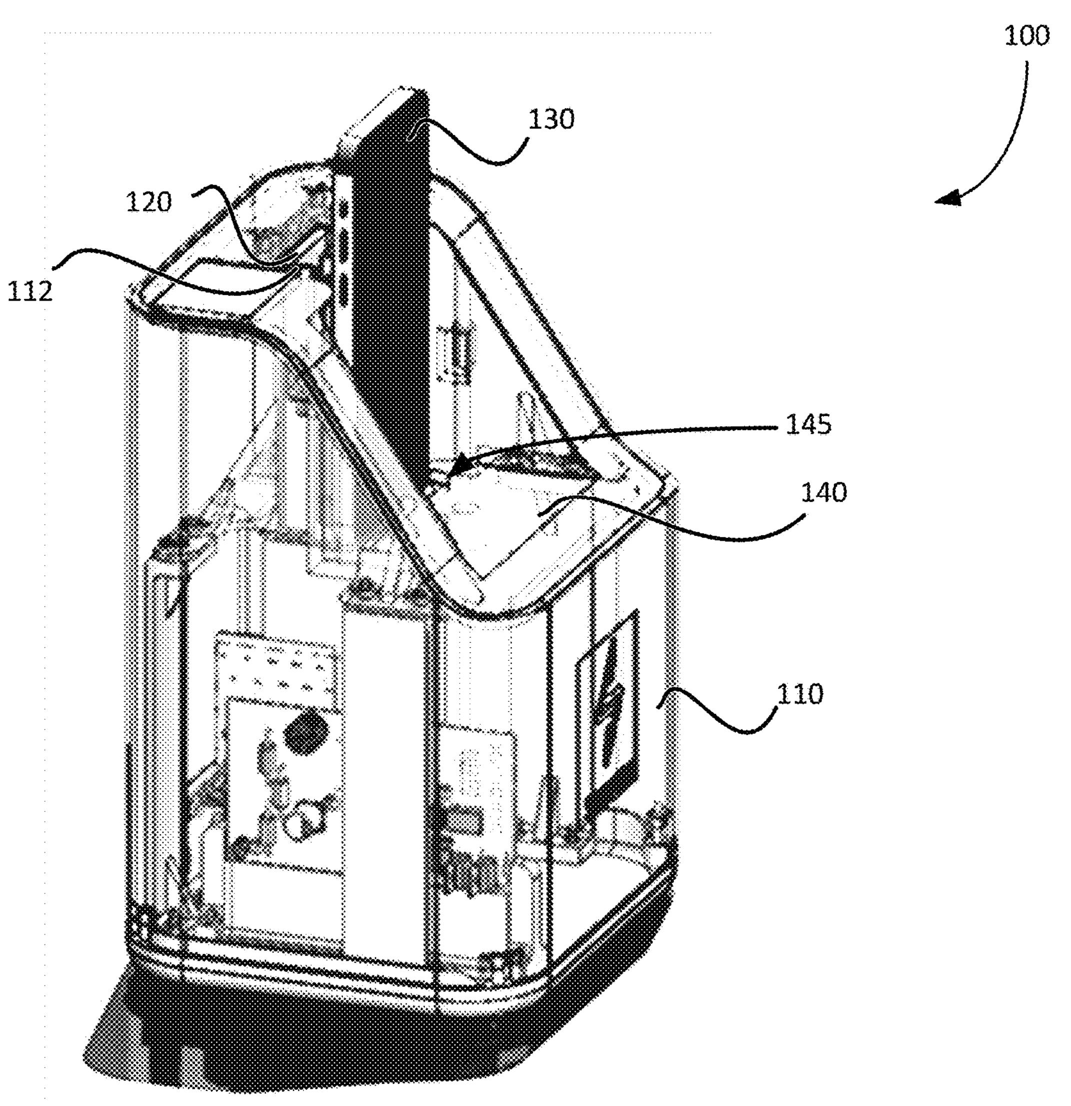
FIGS. 1A and 1B illustrate perspective views of a base unit with a mobile device associated with the base unit, according to embodiments of the present disclosure.
Figure 1B:
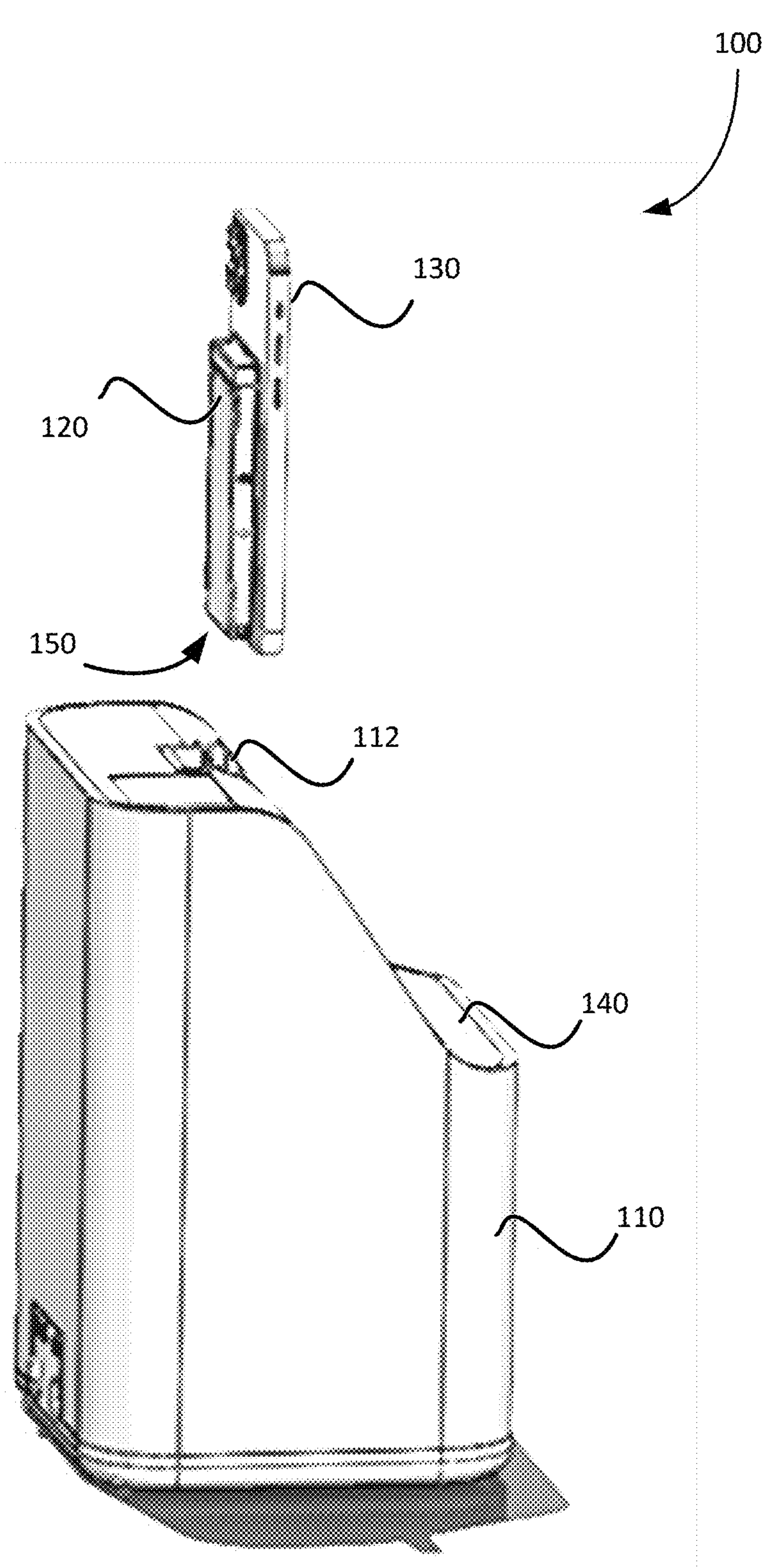

FIGS. 1A and 1B illustrate perspective views of a base unit 110 with a mobile device 130 associated with the base unit 110, according to embodiments of the present disclosure. The presently disclosed system 100 includes a base unit 110 and a battery housing attachment 120 that is attached to a mobile device 130 via a clip frame that selectively secures a battery housing attachment 120 (that includes the external battery 150) with the mobile device 130. In some embodiments, the external battery 150 can be a rechargeable lithium ion battery. In some embodiments, the external battery 150 can be selected from the group consisting of: an aluminum ion battery, a lead-acid battery, a glass battery, a silicon air battery, a nickel-cadmium battery, a nickel metal hydride battery, and/or any declarable battery.

The base unit 110 includes a receiving assembly 112 that receives the battery housing attachment 120 of the mobile device 130. When the external battery 150 used by the mobile device 130 is depleted, the user places the mobile device 130 within the mobile device receiving assembly 112 in order to automatically swap out the depleted external battery 150 for a fully charged external battery 150. The battery housing attachment 120, in conjunction with the receiving assembly 112, is configured to position the mobile device 130 in an upward position in relation to the base unit 110.

FIG. 1A shows a transparent base unit 110 with some of the internal components visible, while FIG. 1B shows the base unit 110 separated from the mobile device 130 (and the associated battery housing attachment 120 and external battery 150).

Figure 2:
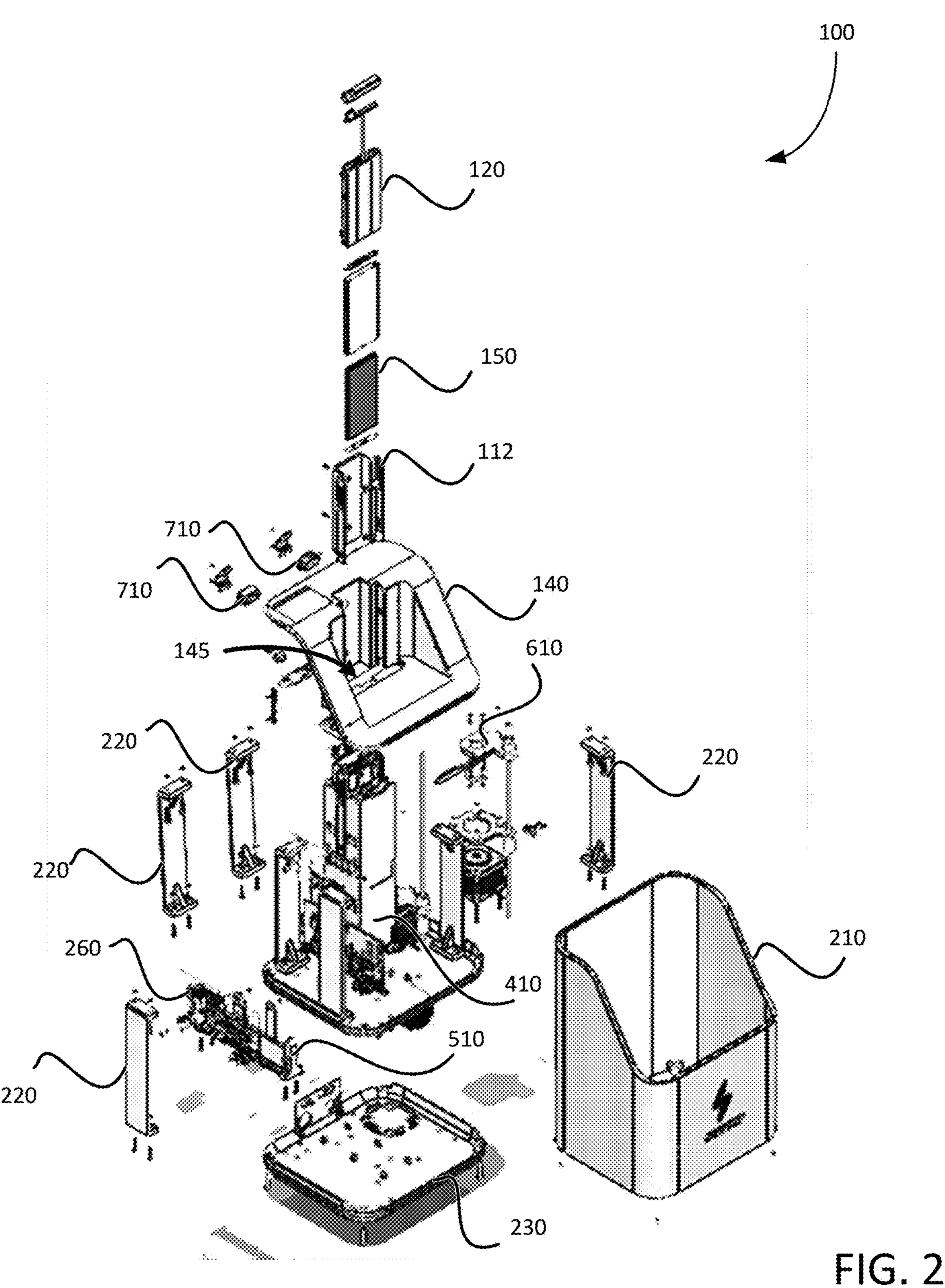
FIG. 2 illustrates an exploded view of the system, according to embodiments of the present disclosure.

FIG. 2 illustrates an exploded view of the system 100, according to embodiments of the present disclosure. In some embodiments, the base unit 110 of the disclosed battery swapping system 100 includes a housing 210 that includes a plurality of side walls that are reinforced via pillars 220 to support and connect the plurality of side walls. The plurality of side walls and pillars 220 are arranged to enclose the components of the disclosed system 100. The plurality of side walls and pillars 220 can consist of a metal, a plastic, a carbon fiber, or any combination thereof.

Additionally, the base unit 110 includes a base plate 230 and a top plate 140. The top plate 140 includes an aperture 145 to allow for components of the disclosed system 100 (e.g., external batteries) to pass between the interior and exterior of the base unit 110 to achieve the functionality of the disclosed system 100. The base plate 230 is configured to secure the internal components of the housing into place. In some embodiments, a receiving assembly 112 attaches to the top plate 140 to position the battery housing attachment 120 coupled to the mobile device 130 over the aperture 145 in the top plate 140. In some embodiments, the aperture 145 of the top plate 140 includes a gasket that prevents dust and liquid from entering the interior of the base unit 110.

In some embodiments, the base unit 110 includes a socket for receiving an electrical power supply cord. The power supply cord is plugged into a power source, such as an electrical outlet, to power the base unit 110. In some embodiments, the socket is an Alternating Current (AC) 250 Volt (V) 10 Amp (A) three-terminal female socket. In other embodiments, different sockets and power cords can be used based on the power demand of the system 100 and/or the electrical environment the system 100 is used. For example, the differences in electrical outlets in different countries may result in embodiments of the disclosed system 100 using different sockets with different connectors, voltage ratings, amperages, and combination thereof. In some embodiments, the base unit 110 includes a power cord that is integrated with the socket so that the user simply plugs the power cord into an electrical outlet to use the disclosed system 100.

The base unit 110 includes a controller 260, (such as main control board, a processor and memory device, a system on a chip, or the like), a plurality of controllers and a plurality of sensors to coordinate the movements of the internal components of the base unit 110. Additionally, the controller 260 provides feedback to the user of the disclosed system 100. For example, the feedback provided to the user can be either visual and/or auditory feedback. The main control board 260 includes programmable hardware that can be programed with logic in order to execute the automated functionality of the disclosed system 100. In some embodiments, the programmable hardware is programed to provide one or more of the following functionalities: charging management, audio visual feedback, audio volume control, modifying the number of external batteries, and/or received battery pass criterion. These instructions may be included in computer readable storage media (which are understood to not describe transmission media or signals per se) included in a processor or in communication with a processor on the controller 260.

In some embodiments, the controller 260 is responsible for executing the movements of all internal components of the base unit. For example, the controller 260 coordinates the movements of a latch release assembly, a first traversing stage assembly, a second traversing stage assembly, and battery charging slots in order to execute the battery receiving, installing, and charging functions of the disclosed system 100. Additionally, the controller 260, in conjunction with the sub-controllers and sensors, automatically manages the external batteries 150 stored within the base unit 110 to ensure that the external batteries 150 are fully charged and prepared to be installed within a mobile device 130 that is placed on the receiving assembly 112.

In some embodiments, the base unit 110 includes a fan that circulates air within the base unit 110 or vents air into or out of the base unit 110 to ensure that the components within the base unit 110 do not overheat. The fan within the base unit 110 is powered by the electrical power source used by other components of the disclosed system 100.

Figure 3A:
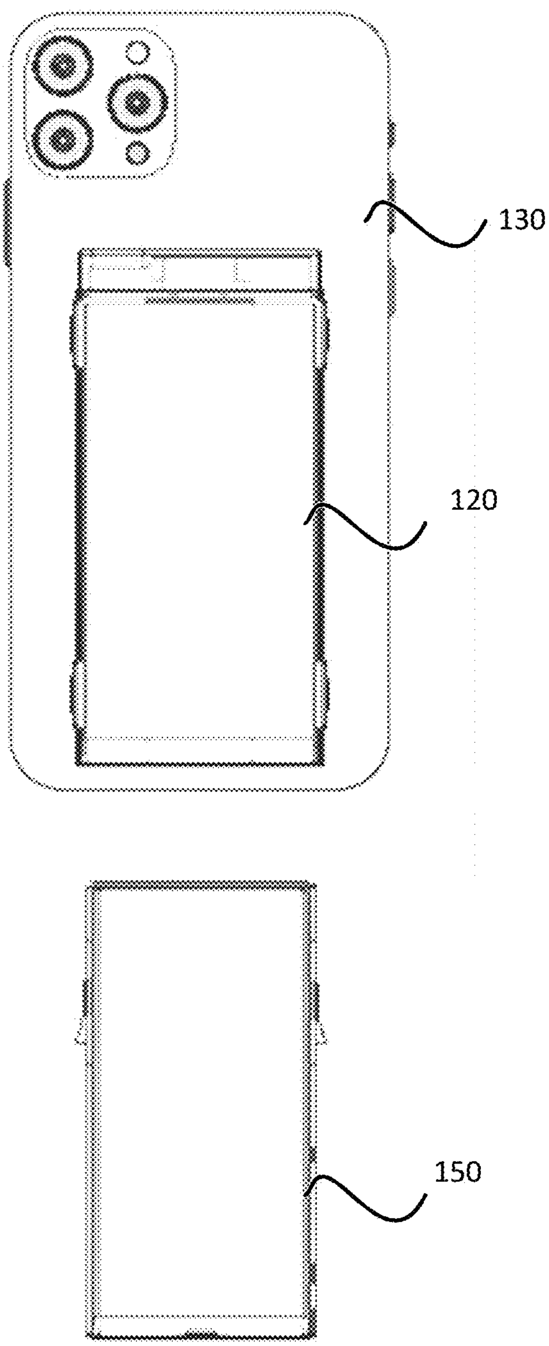
FIGS. 3A-3C illustrate insertion or removal of an external battery to/from a battery housing attachment associated with a mobile device, according to embodiments of the present disclosure.
Figure 3B:
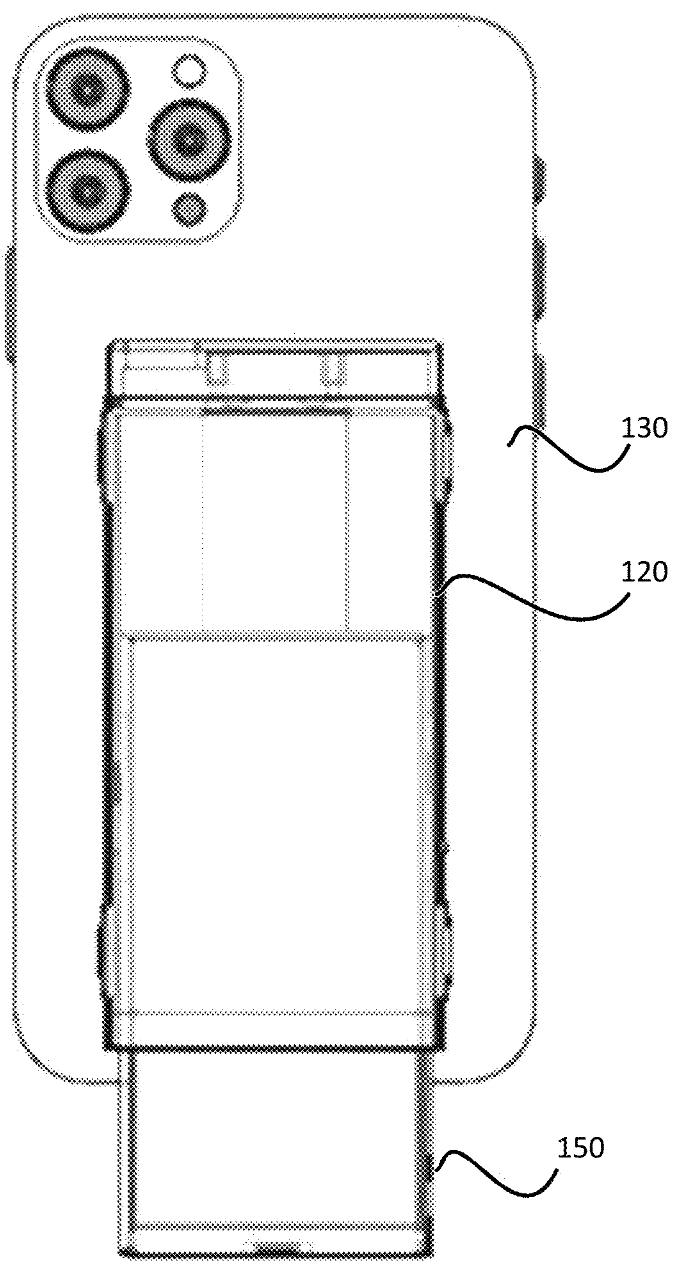
Figure 3C:
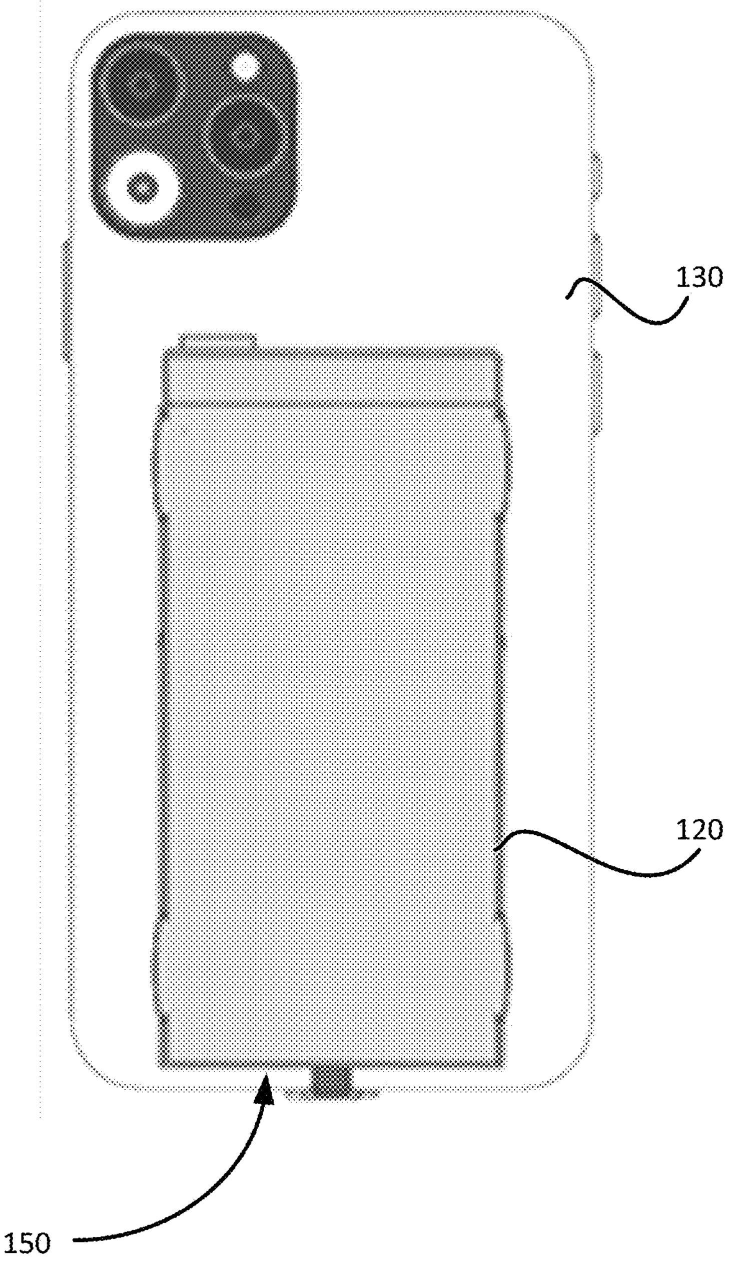

FIGS. 3A-3C illustrate insertion or removal of an external battery 150 to/from a battery housing attachment 120 associated with a mobile device 130, according to embodiments of the present disclosure. FIG. 3A shows an external battery 150 in an uninstalled state relative to the battery housing attachment 120 of a mobile device 130 of a mobile phone. FIG. 3B shows an external battery 150 in a partially installed stated, such as when being removed from or installed in the battery housing attachment 120 of a mobile device 130. FIG. 3C shows an external battery 150 in an installed state relative to the battery housing attachment 120 of a mobile device 130.

In some embodiments, the battery housing attachment 120 can be integrated with the housing of the mobile device 130 or to a casing for the mobile device 130 that holds the battery 150. For example, the external housing or casing applied to the mobile device 130 can include a built-in clip or an aftermarket clip (such as discussed in relation to FIGS. 8A-8C) or other retention mechanism that holds the battery housing attachment 120 to the mobile device 130. The various other retention mechanisms can include cases or shells that integrate the mating features for a battery housing attachment 120 or a battery, cavities defined in the mobile device 130 for the insertion for alkaline batteries or power-packs, or the like. Accordingly, a mobile device case with built-in clip frame is customizable based on user preferences for different aesthetic designs, battery size considerations, battery location considerations, and combinations thereof. Additionally, a mobile device case according to the present disclosure, includes functional aspects such as camera lens apertures and volume control buttons. The mobile device case with an integrated mobile device attachment frame holds an external battery 150 and facilitates the electrical connection, thereby passing an electrical charge to the mobile device 130 from external battery 150 as explained herein.

The battery housing attachment 120 joins the mobile device 130 to the external battery 150 and facilitates an electrical charge being passed from the external battery 150 to the mobile device 130 through a cable, such as an ultra-thin Universal Serial Bus (USB) type-c or lightning cable. In some embodiments, the battery housing attachment 120 includes a main frame housing. The main frame housing houses the external battery 150 and positions the external battery 150 in a manner that allows the external battery 150 to connect with the additional components of the battery housing attachment 120, which allows an electrical charge to be passed from the external battery 150 to the mobile device 130. For example, the battery housing attachment 120 includes an external battery connector block that facilitates the movement of an electrical charge from the external battery 150 to the mobile device 130. In an embodiment, additional components of the battery housing attachment 120 facilitate the movement of electrical power from the external battery 150 to the mobile device 130 including an external battery charging management system, a charging cable, and a mobile device charging port connector.

In some embodiments, within the battery housing attachment 120, the external battery connector block, the external battery 150, the external battery charging management system, the charging cable, the mobile device charging port connector and the mobile device 130 are all electrically connected so that a charge can pass from the external battery 150 to the mobile device 130. In some embodiments, the external battery connector block is in physical contact with the external battery 150 and includes terminals that interact electrically with the terminals of the external battery 150 to facilitate the movement of electricity. In some embodiments, an external battery charging management system manages the relationship between the external battery 150 and the mobile device 130 to ensure an electrical charge is properly passed between the various components. In some embodiments, the charging cable connects the external battery charging management system to the charging port connector of the mobile device 130 in order for an electrical charge to be passed to the mobile device 130. Finally, the mobile device charging port connector is inserted into the charging port of the mobile device 130 to conduct electricity through the battery housing attachment 120, from the external battery 150 into the internal battery of the mobile device 130. The mobile device's charging port connector can be selected from different connectors depending on the type of mobile device 130 using the disclosed system 100. For example, the mobile device charging port connector can include a USB type C connectors. In an additional example, the mobile device charging port connector can include a micro-USB connector. Several variations are possible depending on the connectors used by the mobile device 130.

In some embodiments, the battery housing attachment 120 includes a status indicator indicating the current battery level of the external battery 150 within the battery housing attachment 120. In some embodiments, the battery housing attachment 120 also includes a power inlet, to allow the user to charge the external battery 150 via wire. In some embodiments, the battery housing attachment 120 includes pass through technology, in case the user wants to charge the external battery 150 via wire, the internal battery of the mobile device 130 is charged before the external battery 150, in parallel to the external battery 150, or after the external battery 150 using the same wiring. The charging management system communicates through the external battery connecting block with the external battery 150 to determine the charge status of the external battery 150. In some embodiments, the charge status of the external battery 150 can be communicated to the user of the system 100 through an indicator, such as a plurality of light beacons on the exterior of the battery housing attachment. Upon receiving an indication that the external battery 150 is near depletion, the user of the mobile device 130 can place the mobile device 130 on the mobile device receiving assembly 112 in order to automatically swap out the external battery 150 according to the present disclosure.

In some embodiments, the battery housing attachment 120 also includes a locking mechanism that reversibly locks the external battery 150 into place within the frame of the battery housing attachment 120. In some embodiments, the locking mechanism is a two-sided latch that holds the external battery 150 in place, in a locked position. However, when a force is applied to the two-sided battery latches, the latch is released; transitioning the latch to the unlocked position, which allows the release of the external battery 150. In some embodiments, the main frame of the battery housing attachment 120 that houses the external battery 150 is laterally offset from the base of the mobile device 130. The slight lateral offset of the external battery 150 allows the external battery 150 to travel freely in a vertical axis without being impeded by the mobile device 130.

In some embodiments, when a user of the disclosed system 100 places a mobile device 130, coupled to the battery housing attachment 120, in the receiving assembly 112, a latch release assembly contacts two side solenoid motors mechanisms to release the lock via the side solenoids pushing the side battery latches, which thereby allows the external battery 150 to freely drop out of the battery housing attachment 120 and into an internal cavity of the base 110. (As is shown in greater detail in regard to FIGS. 7B and 7D with solenoids 710).

As the two side solenoid motor near the rail way path in which the mobile device 130 is coupled to the battery housing attachment 120, the side solenoid motors apply a releasing force to the battery side latches siting on the edge of a hole made on the sides of battery housing attachment 120. The solenoid motors push solenoid heads 710 through holes defined through the battery housing attachment 120 to release the battery latches and thereby allow the external battery 150 to either drop freely from battery housing attachment 120 or with support from the extractor flange 620 and magnet 630. The locking mechanism remains in the unlocked state (e.g., the solenoids continue to exert the releasing force) during the first half of the external battery swapping process, which is when depleted external battery 150 is present in the battery housing attachment 120. This allows for the depleted external battery 150 to drop out (e.g., downward) from the battery housing attachment 120. When a fully charged external battery 150 is to be installed, the side solenoids retract (e.g., removing the releasing force from the latches) so that the side latches 920*a-b* of the fully charged external battery 150 can grab onto the tab-locks 930*a-b* (e.g., holes defined in the side of the battery housing attachment 120) when an extractor flange 620 advances a charged external battery 150 upward for installation into the battery housing attachment 120 according to the present disclosure. The solenoids 710 are extended to push against the side arms 1010*a-b* that then push the side tabs 920*a-b* inward through the tab-locks 930*a-b* during the first half of the swapping process, and the solenoids 710 are retracted to allow the side tabs 920*a-b* of the new external battery 150 to engage with the tab-locks 930*a-b* without the side arms 1010*a-b* pushing inward during the second half of the swapping process.

Figure 4:
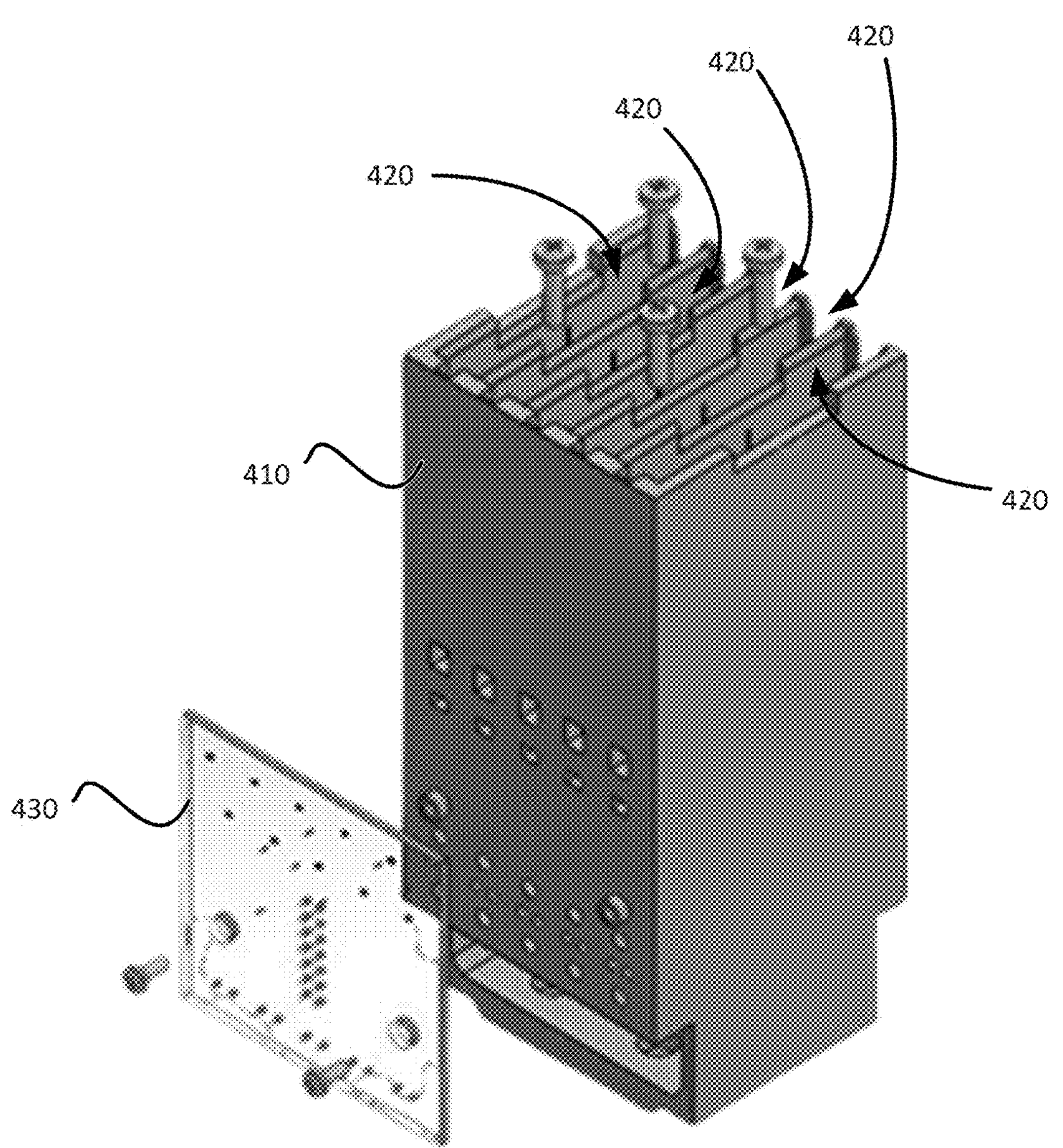
FIG. 4 illustrates a battery carrier unit, according to embodiments of the present disclosure.

FIG. 4 illustrates a battery carrier unit 410, according to embodiments of the present disclosure. The battery carrier unit 410 includes a plurality of slots 420*a-f* (generally or collectively slots 420, which may include more or fewer slots 420 in the plurality of slots 420 in other embodiments from what is shown in FIG. 4) shaped to receive and carry a plurality of external batteries 150. The bottom surface of the battery carrier unit 410 includes a smaller aperture that is large enough to allow an extractor flange of a second traversing stage (discussed in greater detail regard to FIGS. 6A-6C) to pass through a given slot 420 of the battery carrier unit 410 to exert an upward force on one of the external batteries 150 during the installation phase of automatic battery swapping. However, the aperture on the bottom surface of the battery carrier unit 410 is small enough to prevent the external battery 150 from passing through and dropping out of the bottom of the battery carrier unit 410. A traversal hole runs between each of the top and bottom openings for each slot 420 so that the arm of the extractor flange 620 can be inserted through a third side of the battery carrier unit 410 and move from the first side to the second side (or vice versa) when guiding external batteries 150 into or out of the battery carrier unit 410. Therefore, the plurality of external batteries 150 is retained by the battery carrier unit 410 and each external battery 150 thereof can only exit the slots through the top of the battery carrier unit 410 when a force from beneath the external battery 150 is exerted on a given external battery 150. On the back of the battery carrier unit 410 a charging panel 430 is mounted to control and monitor the charging of the external batteries 150 when placed in the battery carrier unit 410.

Figure 5:
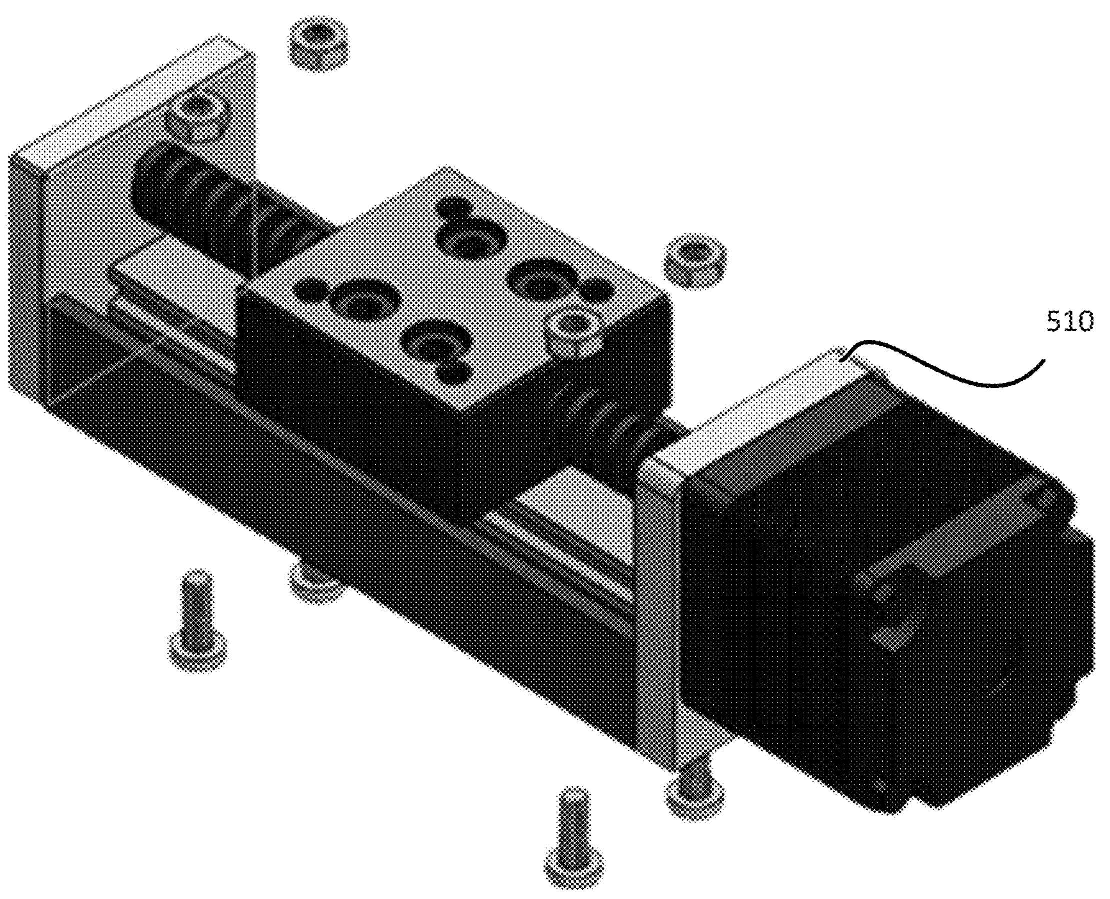
FIG. 5 illustrates an example first traversing stage, according to embodiments of the present disclosure.

FIG. 5 illustrates an example first traversing stage 510, according to embodiments of the present disclosure. The first traversing stage 510 includes an electrical motor that receives power from the base unit's external power source and drives the first traversing stage 510 along parallel rails along an x-axis of the system 100. Although in a preferred embodiment the x-axis of the system 100 is aligned horizontally, the system 100 or the first traversing stage 510 may be aligned in other directions (e.g., within ±10 degrees of horizontal, within ±45 degrees of horizontal). The first traversing stage 510 is in communication with the controller 260 of the base unit 110 to coordinate the movements of the first traversing stage 510.

In some embodiments, the battery carrier unit 410 is coupled to the first traversing staging 510. When a mobile device 130 is placed within the mobile device receiving assembly 112 of the base unit 110, the controller 260 communicates with the first traversing stage 510 and instructs the first traversing stage 510 to travel relative to the aperture 145, in a manner so that an empty slot 420 of the battery carrier unit 410 is aligned with (e.g., positioned below) the aperture 145 in the top plate 140 of the base unit 110 to receive a depleted external battery 150. The controller 260 coordinates the movement of the first traversing stage 510 with the movement of a second traversing stage (610) so that both components are positioned to execute the correct phase of automatic swapping, either receiving a depleted external battery 150 or installing a fully charged external battery 150. Additionally, the controller 260 determines whether the received depleted external battery 150 is correctly positioned inside the battery carrier unit 410 and provides feedback to the user of the system 100 when correction is necessary.

Each external battery 150 of the plurality of external batteries 150 stored in the battery carrier unit 410 is recharged through contact with back panel 430 attached to the battery carrier unit 410. The terminals located on the back panel 430 of the battery carrier unit 420 are in communication with the controller 260 and are capable of relaying the battery charge status of the one or more external batteries 150 being charged to the controller 260 as well as whether or not an external battery 150 is present in a specific slot 420 of the battery carrier unit 410. In some embodiments, the controller 260 instructs the first traversing stage 510 to move a battery carrier unit 420 within the opening 145 of the top terminal plate of base unit 110 to both receive a depleted battery 150 and install a fully charged battery 150 in an associated mobile device 130.

In various embodiments, the back panel 430 contacts the charging terminals of the external batteries 150 held within the battery carrier unit 410, and the back panel 430 tests the received external battery 150 and compares that external battery 150 with the all available external batteries 150, and thereby allows the controller 260 to select the most-fully charged external battery 150 for delivery to a mobile device 130. Accordingly, the controller 260 signals the first traversing stage 510 to position the slot 420 holding the best-charged external battery 150 for installation in alignment with the aperture 145.

Figure 6A:
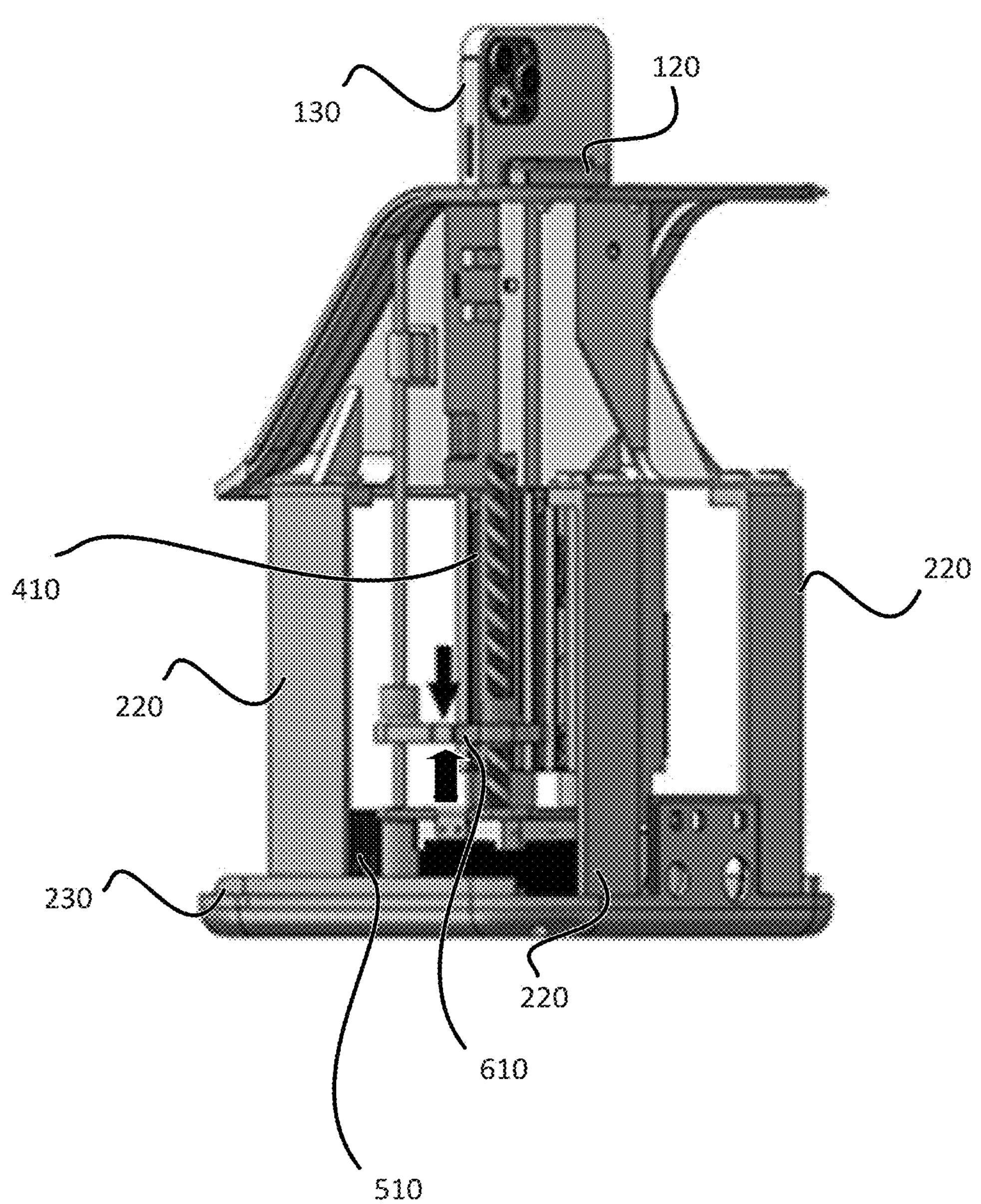
FIGS. 6A-6C illustrate a second traversing stage and components thereof, according to embodiments of the present disclosure.
Figure 6B:
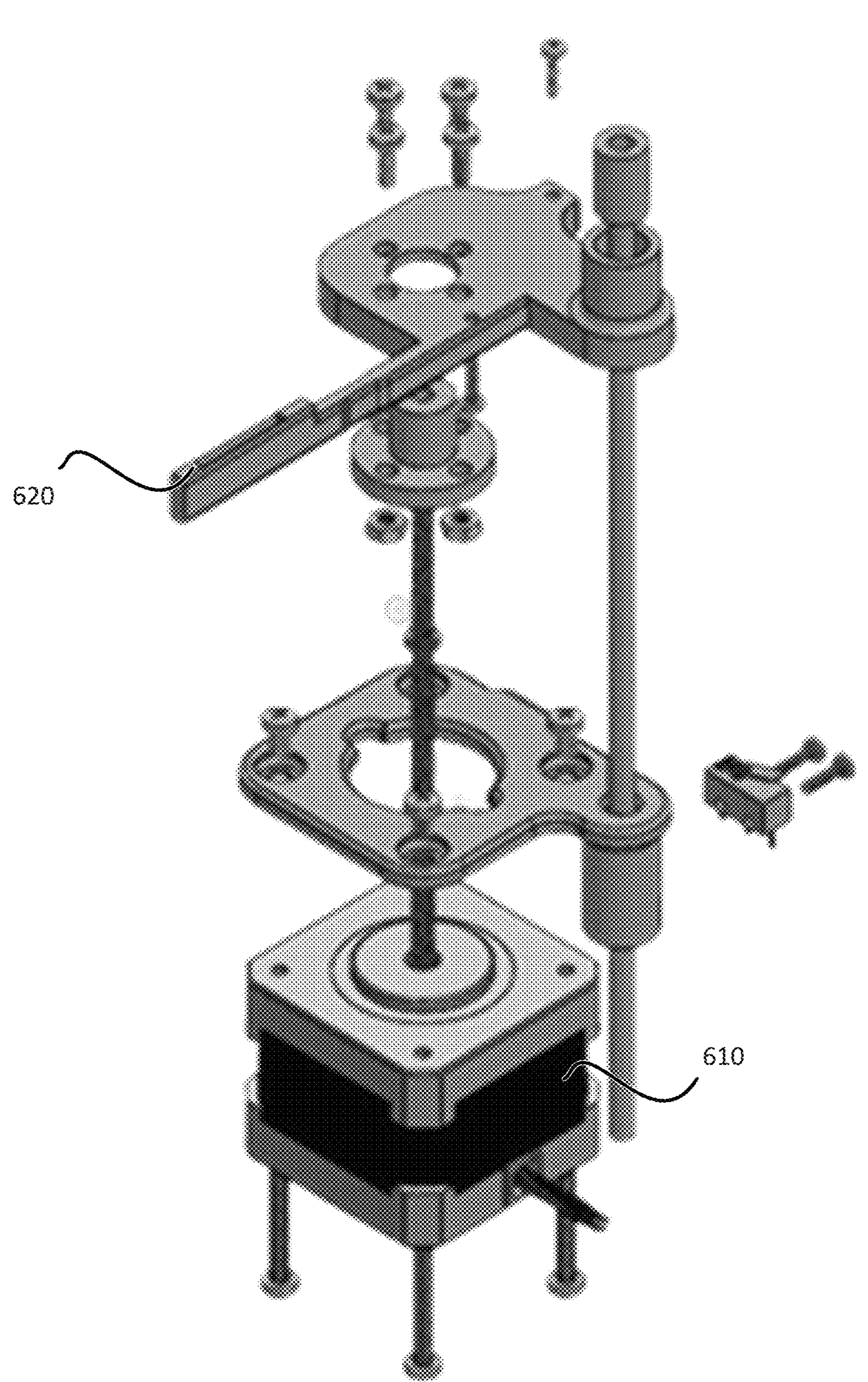
Figure 6C:
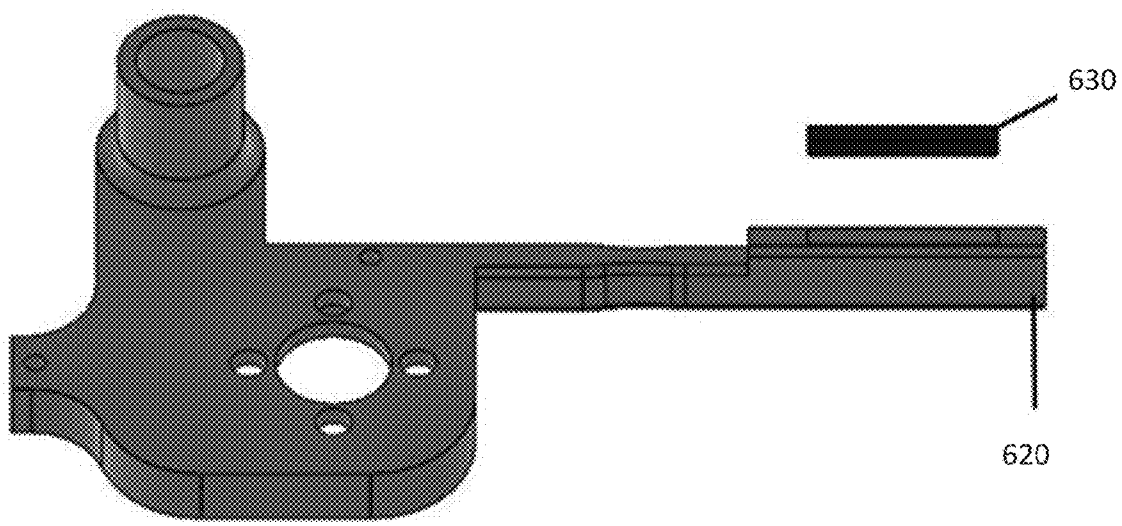

FIGS. 6A-6C illustrate a second traversing stage 610 and components thereof, according to embodiments of the present disclosure. As shown in FIG. 6A, the second traversing stage 610 moves on a second axis, perpendicular to a first axis that the first traversing stage 510 moves on, to guide external batteries 150 into or out of a slot 420 aligned by the first traversing stage 510 with the aperture 145.

As shown in FIG. 6B, the second traversing stage 610 assembly includes an electrical motor that receives power from the base unit's external power source and drives the second traversing stage 610 along parallel rails along a y-axis of the system 100. Although in a preferred embodiment the y-axis of the system 100 is aligned vertically, to allow for gravity to aid in the dropping the external battery 150 from the battery housing attachment 120, the system 100 or the second traversing stage 610 may be aligned in other directions (e.g., within ±10 degrees of vertical, within ±45 degrees of vertical). The second traversing stage 610 is in communication with the controller 260 of the base unit 110 to coordinate the movements of the second traversing stage 610. In some embodiments, when a mobile device 130 is placed within the mobile device receiving assembly 112, the controller 260 communicates with the second traversing stage 610 and instructs the second traversing stage 610 to travel in a first direction toward the aperture 145 in the top plate of the base unit 110 (e.g., upward) to receive a depleted external battery 150 to guide the depleted external battery 150 into an awaiting empty slot 420.

In some embodiments, the second traversing stage 610 also includes an extractor flange 620 that contacts the external battery 150 through a magnetic plate 630 placed on the upper side of the extractor flange 620 and guides the external battery 150 into the base unit 110. The extractor flange 620 extends beyond the width of the traveling rail and other mechanisms of the second traversing stage 610, which allows for the second traversing stage 610 to have extended reach without the second traversing stage 610 occupying a large amount of space within the base unit 110. In some embodiments, the extractor flange 620 is an "L" shaped flange, constructed from the same material as the second traversing stage 610, and is coupled to the second traversing stage 610. The extractor flange 620 contacts the bottommost region of the external battery 150 as the external battery 150 is dropping out of the battery housing attachment 120 and guides the external battery 150 as the magnetic plate 630 and natural force of gravity pulls the external battery 150 towards the interior of the base unit 110. In some embodiments, during the installation phase of the automatic swapping process, the extractor flange 620 exerts an upward force on the bottommost portion of the charged external battery 150. The upward force applied by the extractor flange directs the fully charged external battery 150 into the battery housing attachment 120.

Figure 7A:
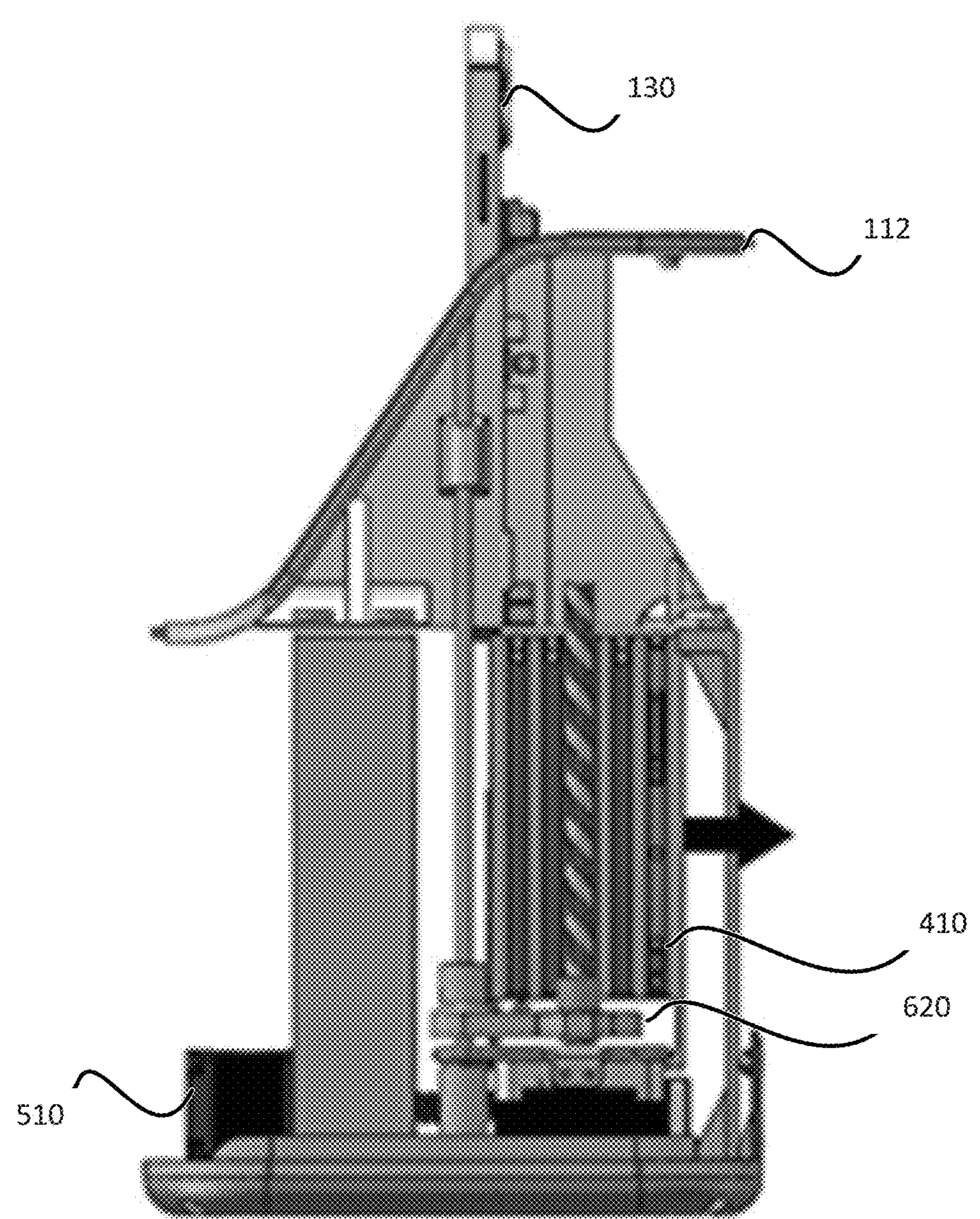
FIGS. 7A-7D illustrate movements of the components of the described system during various phases of the battery swapping process, according to embodiments of the present disclosure.

FIGS. 7A-7D illustrate movements of the components of the described system 100 during various phases of the battery swapping process, according to embodiments of the present disclosure. A user of the disclosed system 100 may begin the process by placing a mobile device 130 into the mobile device receiving assembly 112 that is attached to the top plate 140 of the base unit 110. The mobile device 130 includes a battery housing attachment 120 in which an external battery 150 is secured that the user wishes to replace with a new battery. Upon detecting that a mobile device 130 has been placed within the mobile device receiving assembly 112, the controller 260 instructs the first traversing stage 510 to execute movements so that the both traversing stage assemblies are positioned beneath the aperture 145 with an unoccupied slot 420 of the battery carrier unit 410 aligned with the aperture 145, as is shown in FIG. 7A.

Figure 7B:
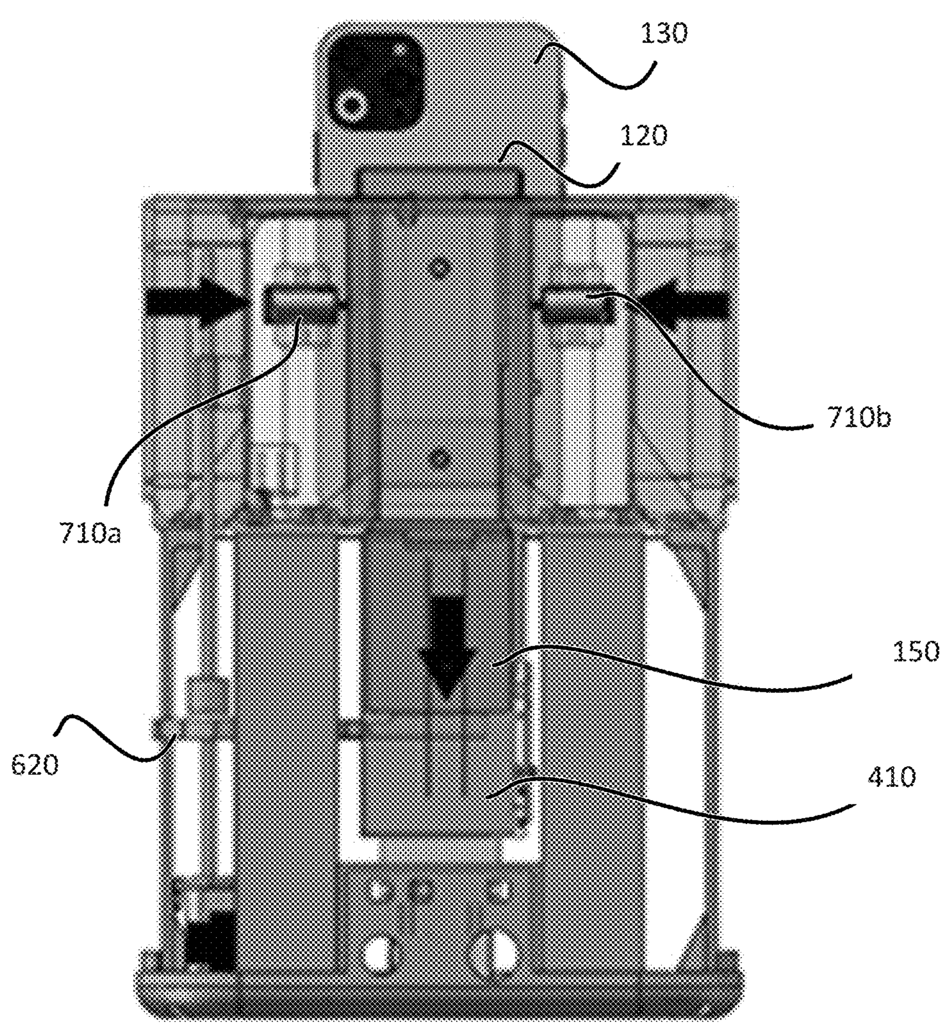

When the controller 260 detects that the battery carrier unit 410, coupled to the first traversing stage 510, is properly positioned, in some embodiments, the controller 260 signals the second traversing stage 610 is to move the extractor flange 620 through empty slot 420 in the battery carrier unit 410 to meet the descending external battery 150 from the mobile device 130. As shown in FIG. 7B, the controller 260 orders the two side solenoid motors 710 attached on the top panel (that is coupled with the receiving assembly 112) to push the side arms 1010*a-b* of the receiving assembly 112 into the two side latches 920*a-b* of the external battery 150 (though the tab-locks 930*a-b*) to thereby release the external battery 150 from the battery housing attachment 120 onto the extractor flange 620. The extractor flange 620 descends back through the empty slot 420 to guide the depleted external battery 150 into the battery carrier unit 410 to be recharged through the back panel 430 and charging terminals of the battery carrier unit 410. The controller 260 of the base unit 110 provides feedback to the user of the system 100 to inform the user whether the depleted battery 150 has been properly received. Although FIG. 7B shows the second traversal stage 610 descending with an affixed depleted external battery 150 (e.g., via gravity, a magnetic coupling, or combinations thereof), it will be appreciated that the controller 260 may omit extending the second traversal stage 610 through the corresponding slot 420 (and thereby omit retracting the second traversal stage 610 back through that slot 420) if the system 100 relies solely on gravity to drop the depleted external battery 150 into the assigned slot 420.

Figure 7C:
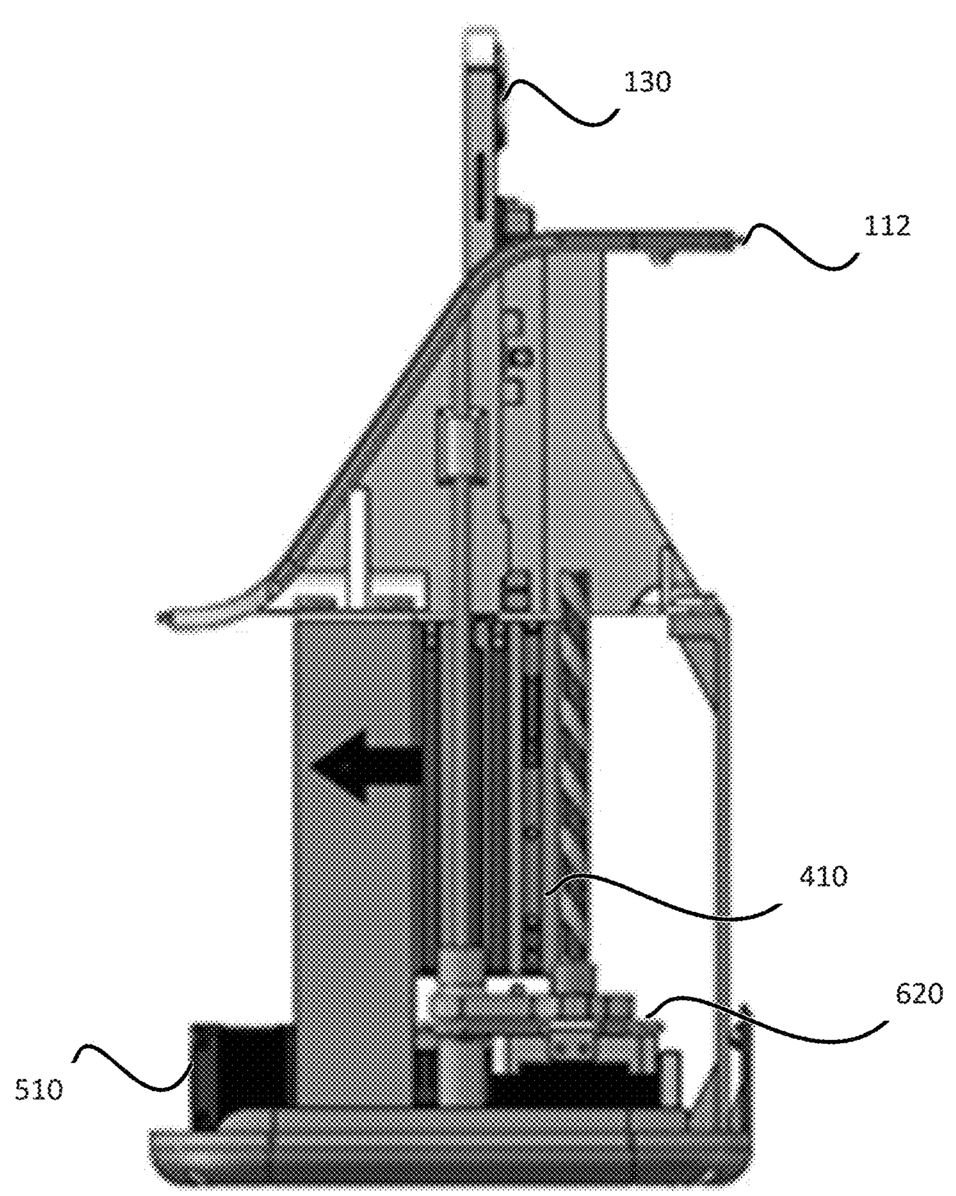

Once the depleted external battery 150 is received, the swapping process may continue to an installation phase for a charged external battery 150 back into the waiting mobile device 130. The controller 260 detects the battery status of each external battery 150 stored in the battery carrier unit 410. The back panel terminals of the battery carrier charging terminal communicate with the controller 260 to allow the controller 260 to select the most suitable external battery 150 from the available external batteries 150 for installation into the battery housing attachment 120 of the mobile device 130 from which the depleted external battery 150 was received. After the controller 260 selects the most suitable external battery 150 (e.g., external battery 150 with the highest charge, the external battery 150 held longest by the base unit 110, a charged external battery 150 of the same dimensions as the depleted external battery 150, and combinations thereof), the controller 260 instructs the first traversing stage 510 to position the battery carrier unit 410 so that slot 420 holding the selected external battery 150 is aligned with (e.g., directly below) the aperture 145 in the top plate exit terminal of base unit 110, as is shown in FIG. 7C.

Once the external battery 150 that was selected for installation is in position, the controller 260 instructs the second traversing stage 610 to move the extractor flange 620 towards the through the slot 420 of the battery carrier unit 410. The extractor flange 620 passes through the aperture on the bottom surface of the battery carrier unit 410 and applies a force on the bottom surface on the selected external battery 150 and forces the external battery 150 out of the battery carrier unit 410 and into the battery housing attachment 120 of the waiting mobile device 130. In various embodiments, the tip of the extractor flange 620 includes a magnet plate which magnetically attaches to a metal plate on the external battery 150 to increase grip thereon.

Figure 7D:
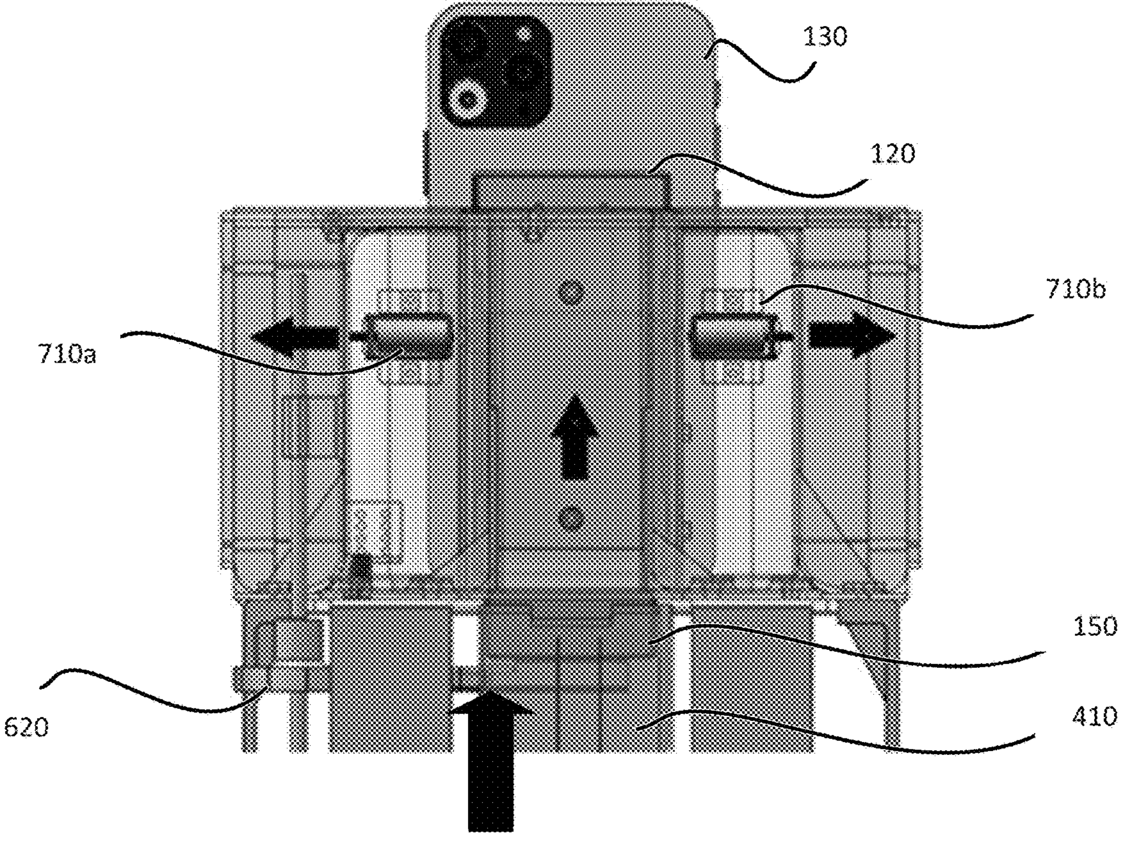

Once the two side latches 920*a-b* of the external battery 150 reach the level of the two tab-locks 930*a-b* made in the battery housing attachment 120, the side latches 920*a-b* grab on to or clip into the tab-locks 930*a-b* to lock the external battery 150 in place. The receiving assembly 112 detects that an external battery 150 has been locked in place via side sensors, as is shown in FIG. 7D.

The controller 260 provides feedback to the user communicating whether the automatic external battery swapping operation has been successful and, when successful, then the user may remove the mobile device 130 from the base unit 110, now with a charged external battery 150. The controller 260 may also provide additional visual or auditory feedback to the user depending on the programming of the controller 260. Both phases of the automatic swapping process are repeated when the user of the mobile device 130 receives indication that the external battery 150 within the battery housing attachment 120 has become depleted.

Figure 8A:
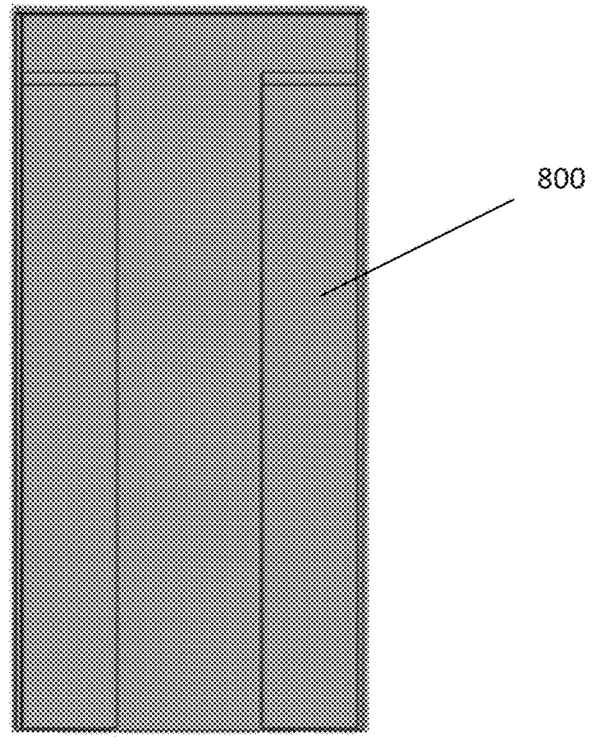
FIG. 8A-8C illustrate a clip frame for securing the battery housing attachment to a mobile device, according to embodiments of the present disclosure.
Figure 8B:
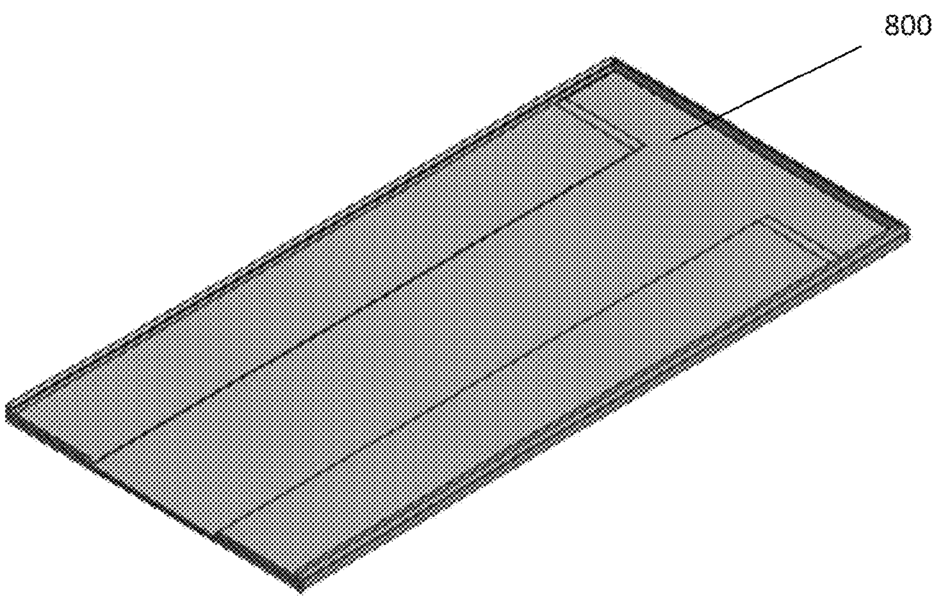
Figure 8C:
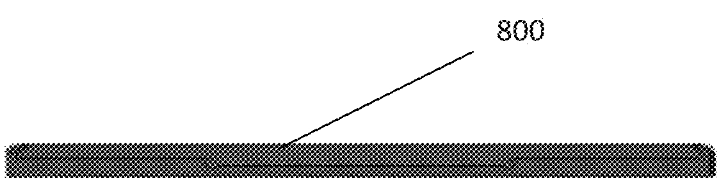

FIG. 8A-8C illustrate a clip frame 800 for securing the battery housing attachment 120 to a mobile device 130, according to embodiments of the present disclosure. In various embodiments, the clip frame 800 includes an adhesive on one side to secure the clip frame 800 to a surface of a mobile device 130 or a case for the mobile device. In some embodiments, the clip frame 800 may be integrated into a case for the mobile device 130 rather than being secured via an adhesive. The clip frame 800 includes a hook-like structure 810 that secures the battery housing attachment 120 to the clip frame 800 when pressed into the clip frame 800. The present disclosure contemplates that different sizes and aspect ratios for the clip frame 800 may be provided to account for different sizes and shapes of the available areas on various mobile devices 150 (e.g., gaming controllers, television controllers, wireless mice/keyboards, tablets, portable gaming consoles, laptops, phones, etc.) to which the clip frames 800 can be attached. Accordingly, a user can attach the same battery housing attachments 120 to various mobile devices 130 using differently designed clip frames 810 adapted to the various mobile devices 130.

Figure 9A:
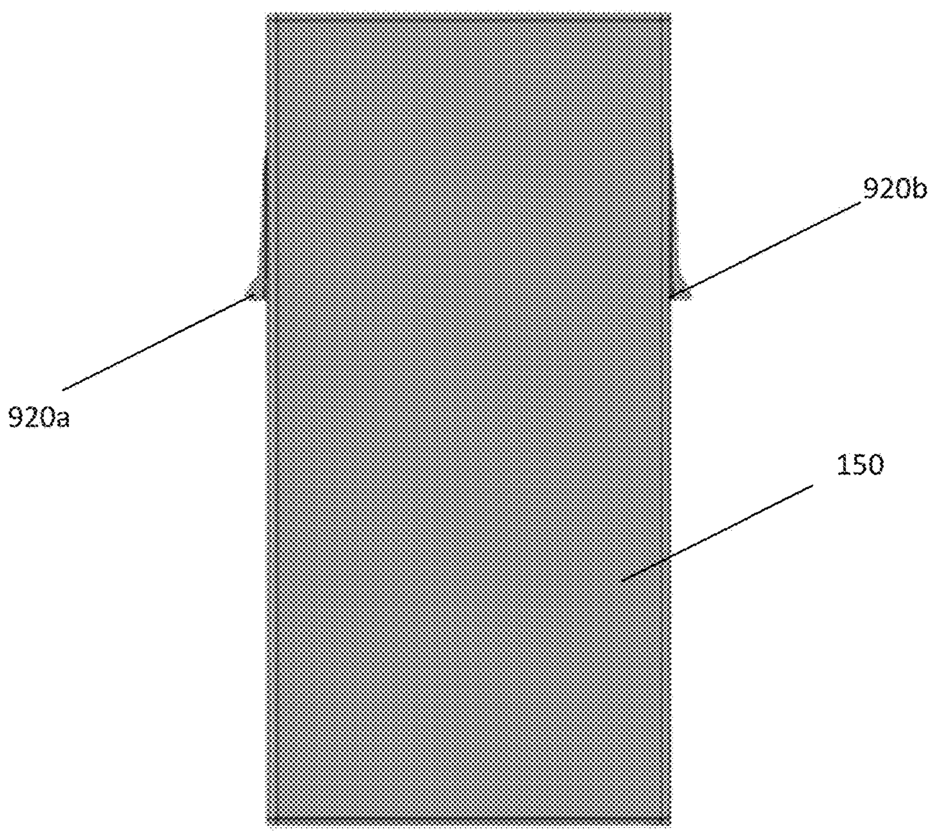
FIGS. 9A-9D illustrate a latching mechanism for securing an external battery within the battery housing attachment, according to embodiments of the present disclosure.
Figure 9B:
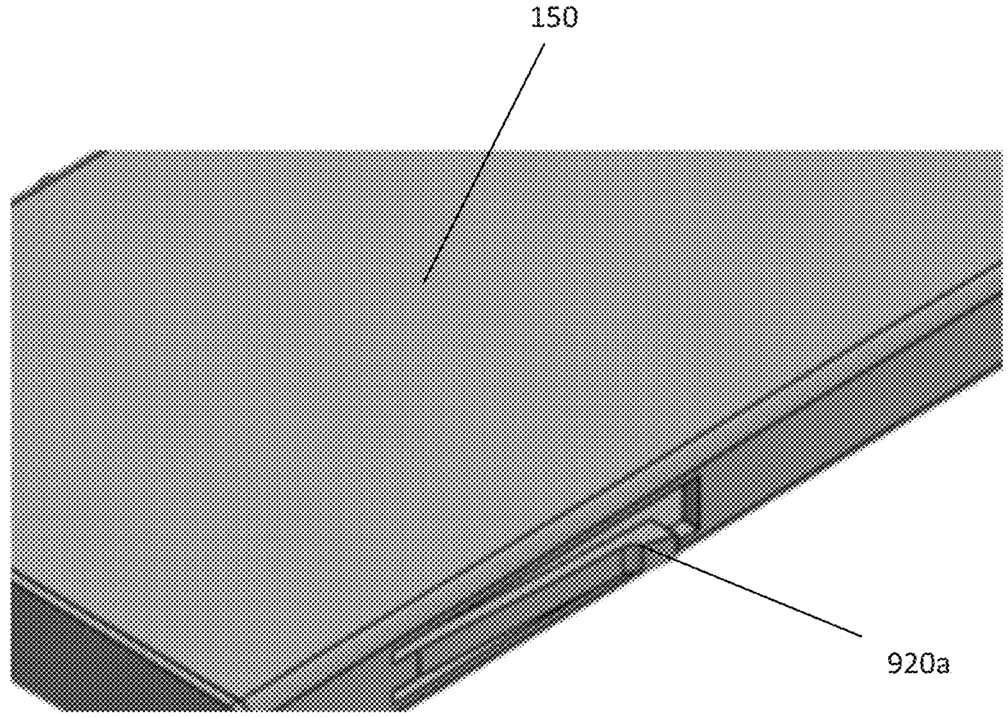
Figure 9C:
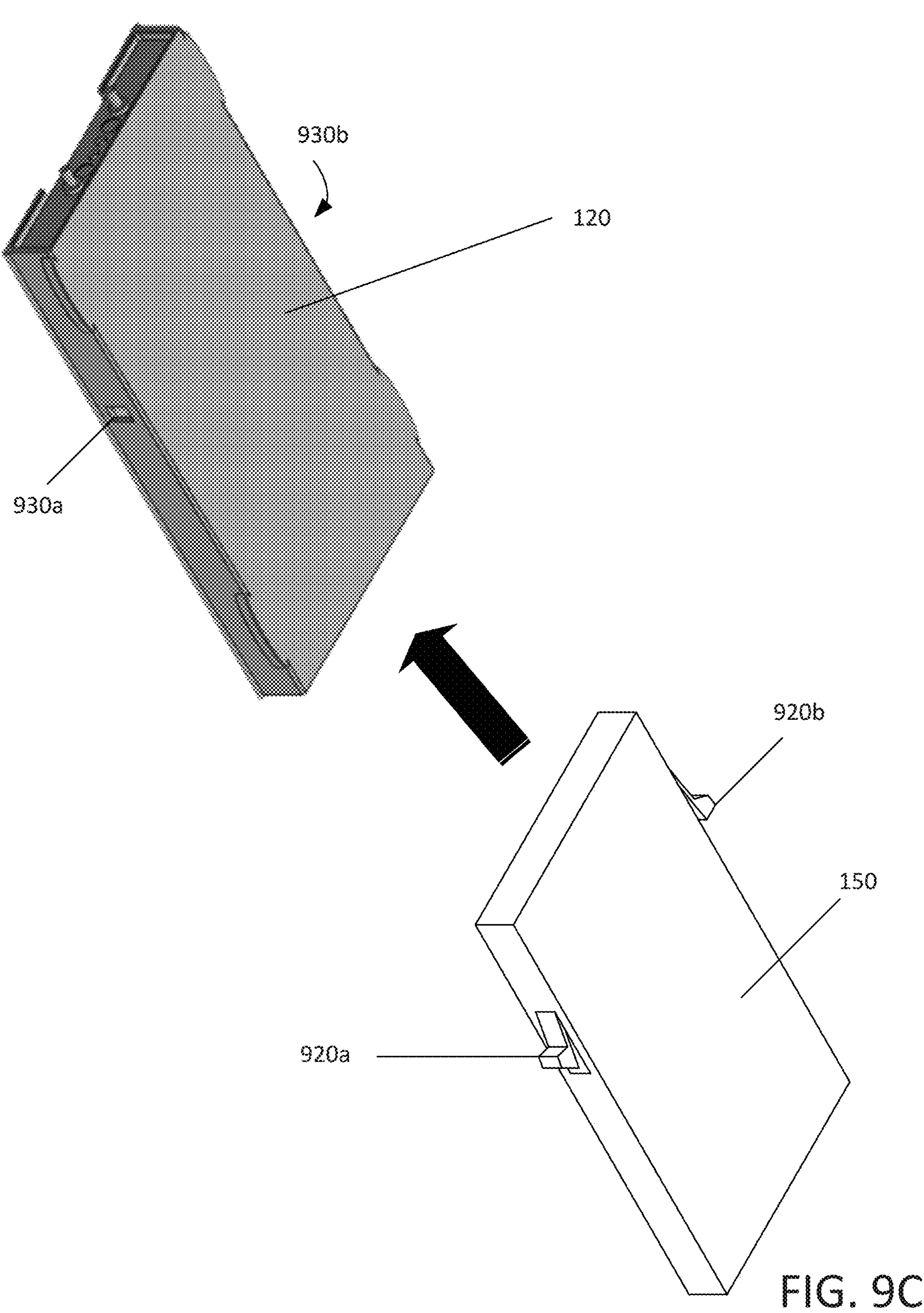
Figure 9D:
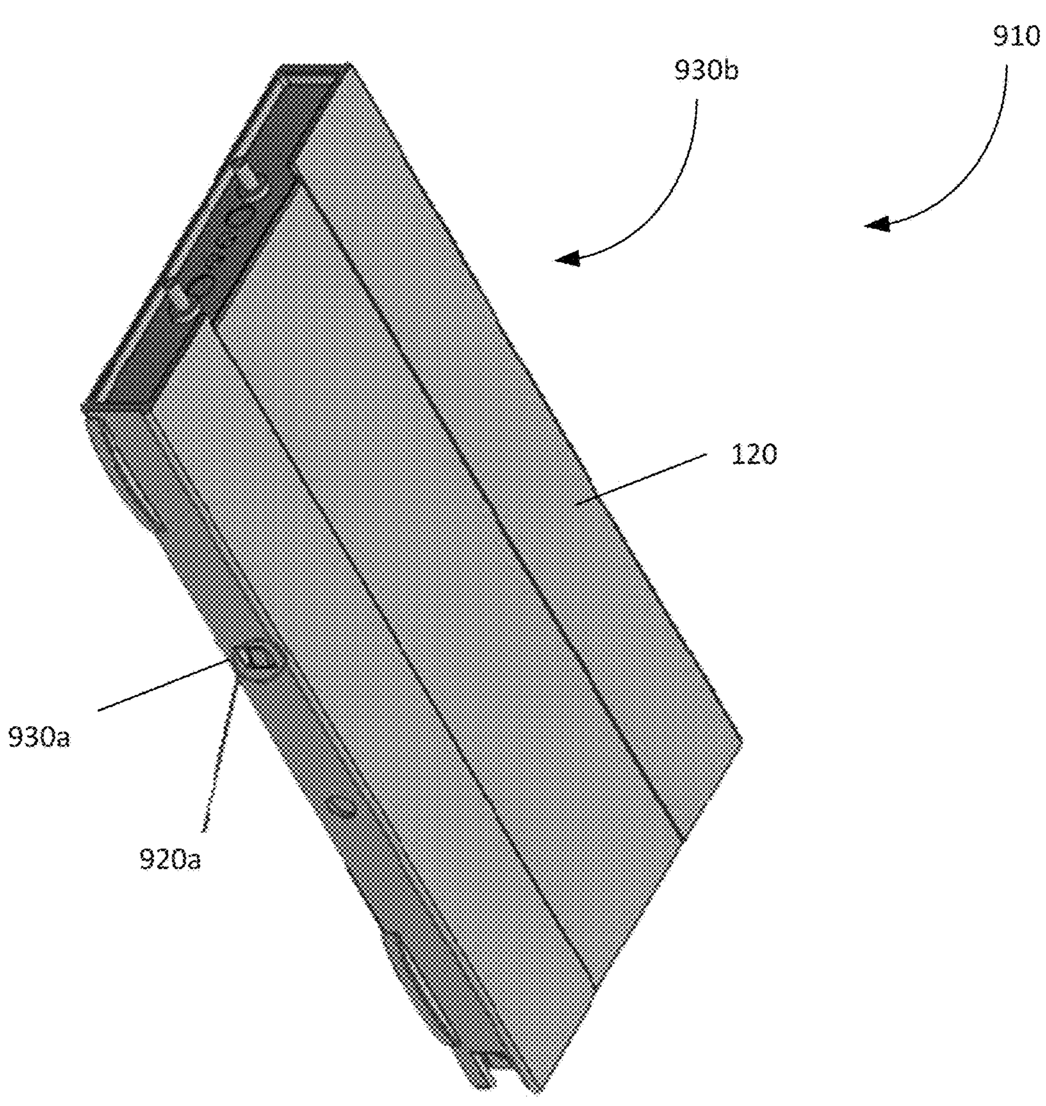

FIGS. 9A-9D illustrate a latching mechanism 910 for securing an external battery 150 within the battery housing attachment 120, according to embodiments of the present disclosure. In various embodiments, the latching mechanism 910 may be integrated in the casing or shell of the external battery 150, and includes one or more tabs 920*a-b* (generally or collectively, tabs 920) that are biased to protrude outward from the body of the external battery 150. When the external battery 150 is inserted into the battery housing attachment 120, as is shown in FIG. 9C, the inner walls of the cavity of the battery housing attachment 120 into which the external battery 150 is inserted push the tabs 920 inward; allowing the external battery 150 to slide into the battery housing attachment 120. Once the tabs 920 reach the corresponding tab-locks 930*a-b* (generally or collectively, tab-lock 930) defined in the battery housing attachment 120, the tabs 920 are allowed to expand outward again; securing the external battery 150 in the battery housing attachment 120 until an external force pushes the tabs 920 inward again.

Figure 10A:
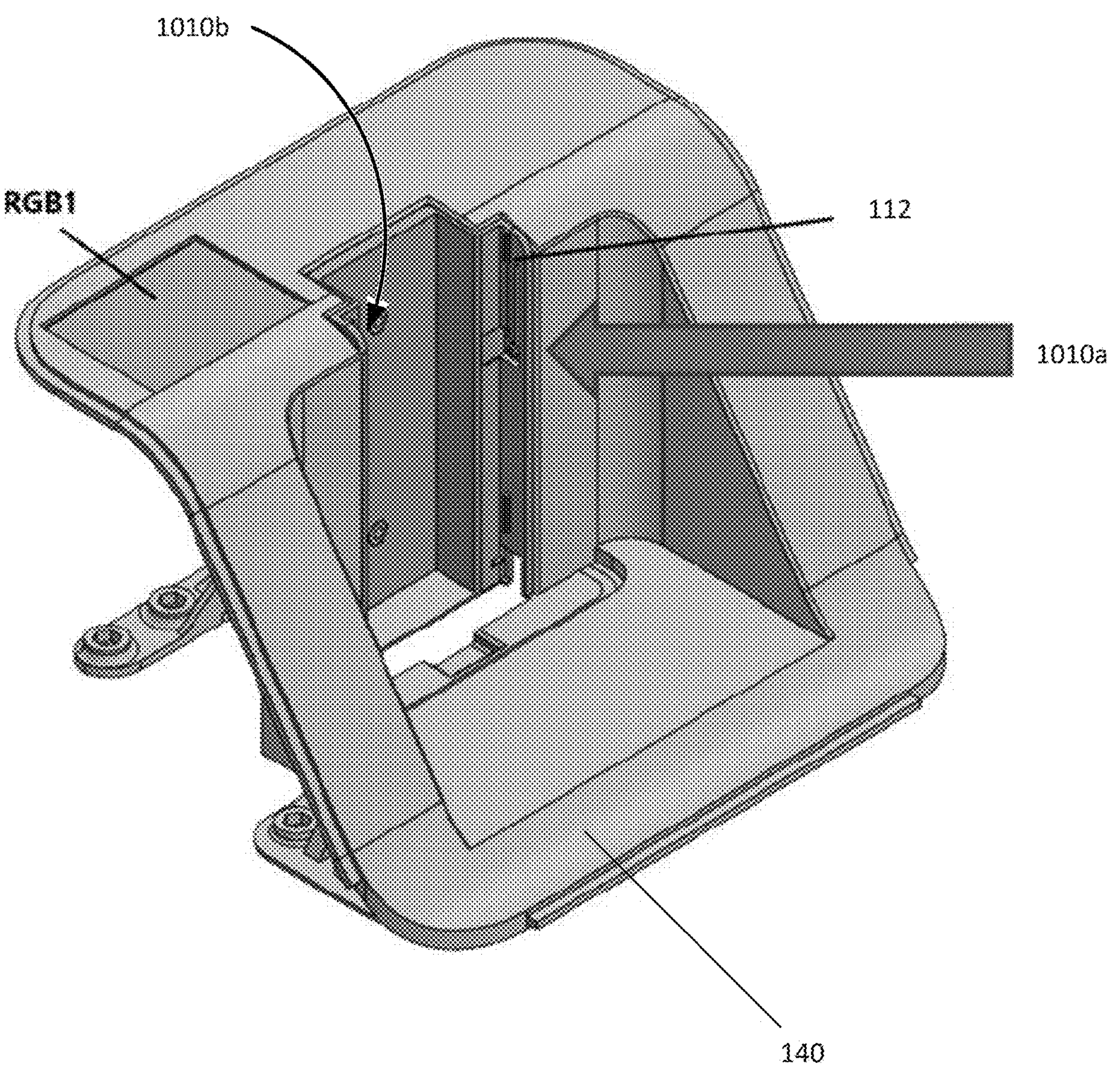
FIGS. 10A-10B illustrate the receiving assembly, according to embodiments of the present disclosure.
Figure 10B:
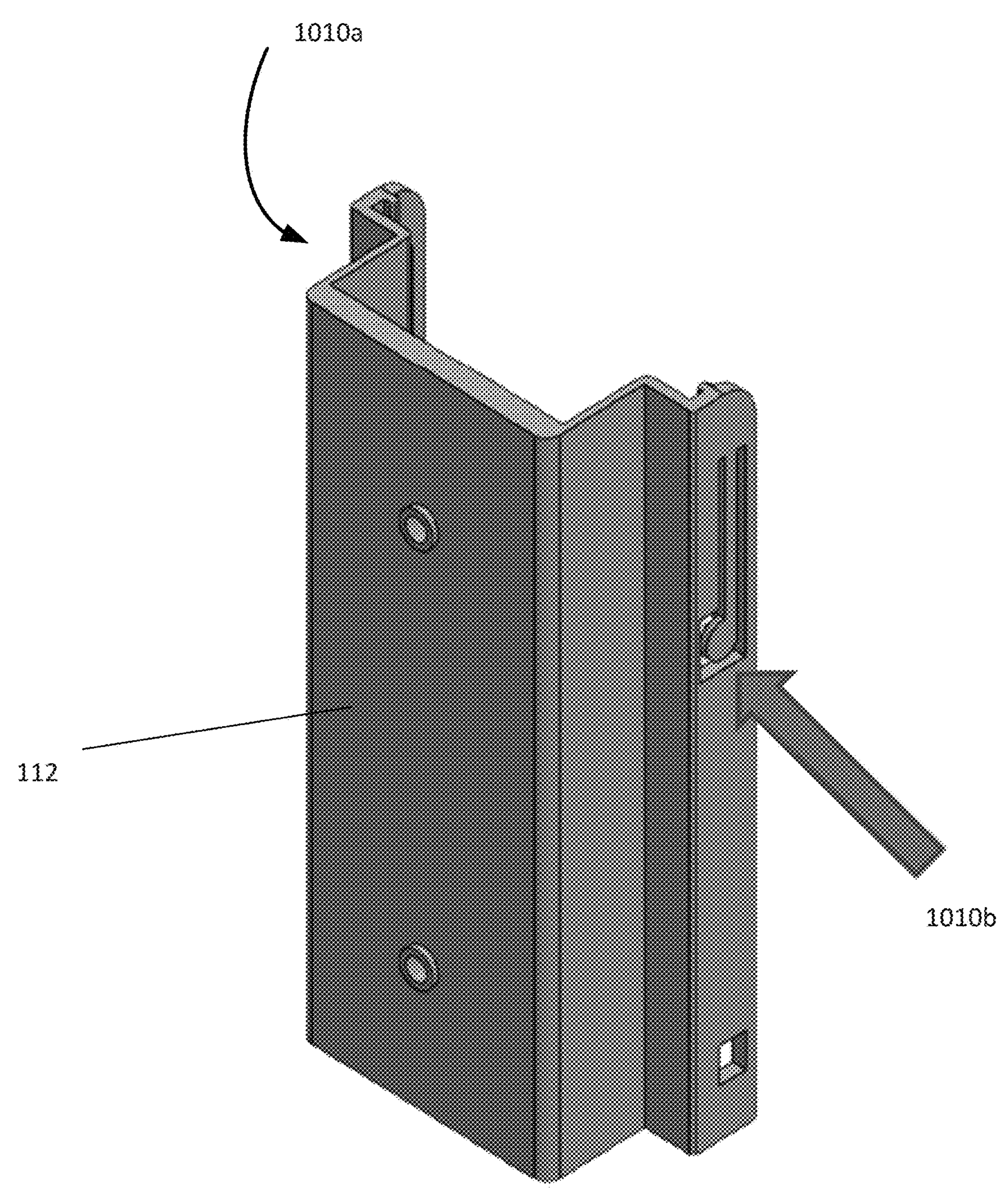

FIGS. 10A-10B illustrate the receiving assembly 112, according to embodiments of the present disclosure. The receiving assembly 122 is included in the top panel 140 of the base unit 110, and once the battery housing attachment 120 coupled with mobile device 130 is received into the receiving assembly 112, the tab-locks 930 are aligned with a corresponding one of the side arms 1010*a-b* (generally or collectively, side arms 1010) of the receiving assembly 112. The side solenoid motors 710 are aligned with the side arms 1010, and when activated apply force to the side arms 1010 that then engage and push the tabs 920 of external battery 150 through the tab-locks 930 to disengage the tabs 920 from the tab-locks 930 and thereby release the external battery 150 from the battery housing attachment 120. Once the external battery 150 is released successfully from the battery housing attachment 120, the solenoids 710 release the side arms 1010 by retracting the respective solenoid heads. Accordingly, the side arms 1010 return to a relaxed position, allowing for the tabs 920 of a newly inserted external battery 150 to engage the tab-locks 930 and secure the external battery 150 within the battery housing attachment 120.

Figure 11A:
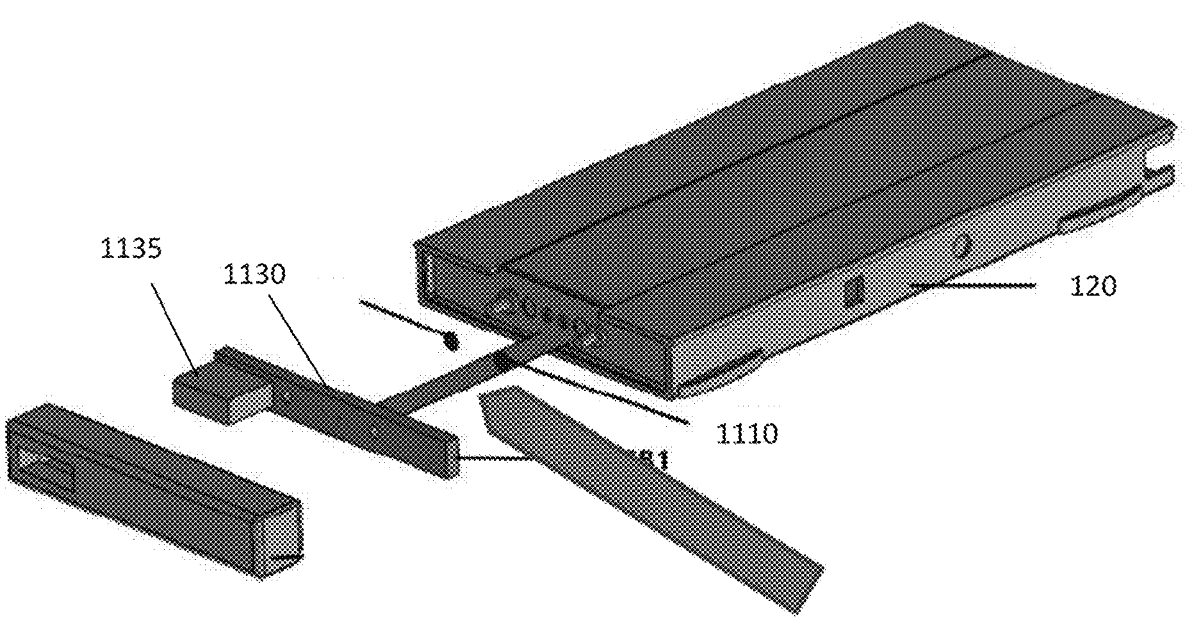
FIGS. 11A-11B illustrate wiring connectivity between the external battery and the internal battery of the mobile device, according to embodiments of the present disclosure.
Figure 11B:
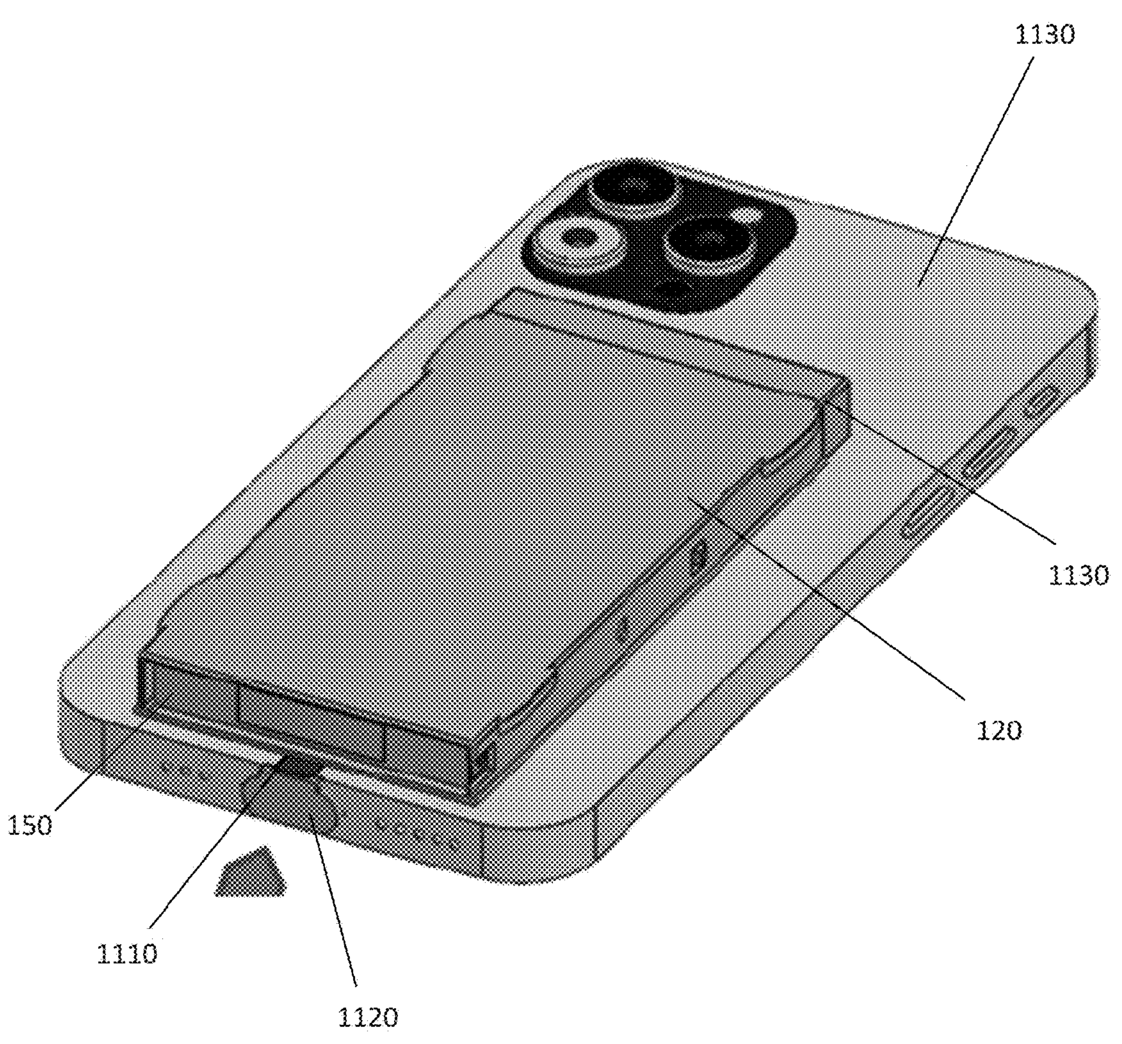

FIGS. 11A-11B illustrate wiring connectivity between the external battery 150 and the internal battery of the mobile device 130, according to embodiments of the present disclosure.

As illustrated, the battery housing attachment 120 includes an integrated flat ultra-thin wire 1110 that travels from the battery housing control 1130 at the top of the battery housing attachment 120 to the bottom of the battery housing attachment 120 to be plugged in to the charging port for the internal battery of the mobile device 130. The present disclosure contemplates that other arrangements of the wire 1110 are possible based on the relative geometries of the mobile device 130 (and associated charging port location) relative to the battery housing attachment 120, and that an internal battery for the mobile device 130 may be omitted or bypassed in various embodiments.

The wire 1110 is positioned to be out of the way of the exit/entry terminal for the battery housing attachment 120 so that the wire 1110 does not interfere with the insertion or removal of external batteries 150 into or out of the battery housing attachment 120.

In some embodiments, the user can selectively remove a plug 1120 connecting the wire 1110 to the internal battery of the mobile device 130. For example, the user may disconnect the wire 1110 by removing the plug 1120 so that the user can directly charge the internal battery of the mobile device 130, cut power to the mobile device 130, enforce usage of power stored in the internal battery before discharging the external battery 150, connect other external devices to the mobile device 130 (e.g., to download images stored on the mobile device via a wired connection), etc.

The battery housing control 1130 includes computing functionality (e.g., a processor and a memory storing instructions executable by the processor to perform various operations) to control a rate of charge or discharge of the external battery 150, report a charge level or other status of the external battery 150, and communicate with external devices. In various embodiments, the battery housing control 1130 may be powered by one or more of the external battery 150 or the internal battery of the mobile device 130, and may include an onboard battery or capacitor array to continue operating while swapping a depleted external battery 150 for a charged external battery 150. In various embodiments, the battery housing control 1130 includes programmable logic to manage power distribution between the internal battery and the external battery 150 so that a selected battery is charged first (or both are charged in parallel) and a charge status of the external battery 150 can be reported to the user (e.g., via a display included in the battery housing attachment 120). Additionally, although the user may swap out a depleted external battery 150 for a fully charged external battery 150 via the base station 110, the battery housing control 1130 can include a charging port 1135 (e.g., a USB, lightning port, etc.) that allows the user to connect an external power source to charge the external battery 150 while secured in the battery housing attachment 120. In various embodiments, the charging port 1135 allows the user to directly charge the internal battery of the mobile device 130, charge the external battery 150, and connect other external devices to the mobile device 130 (e.g., to download images stored on the mobile device via a wired connection), etc.

Figure 12:
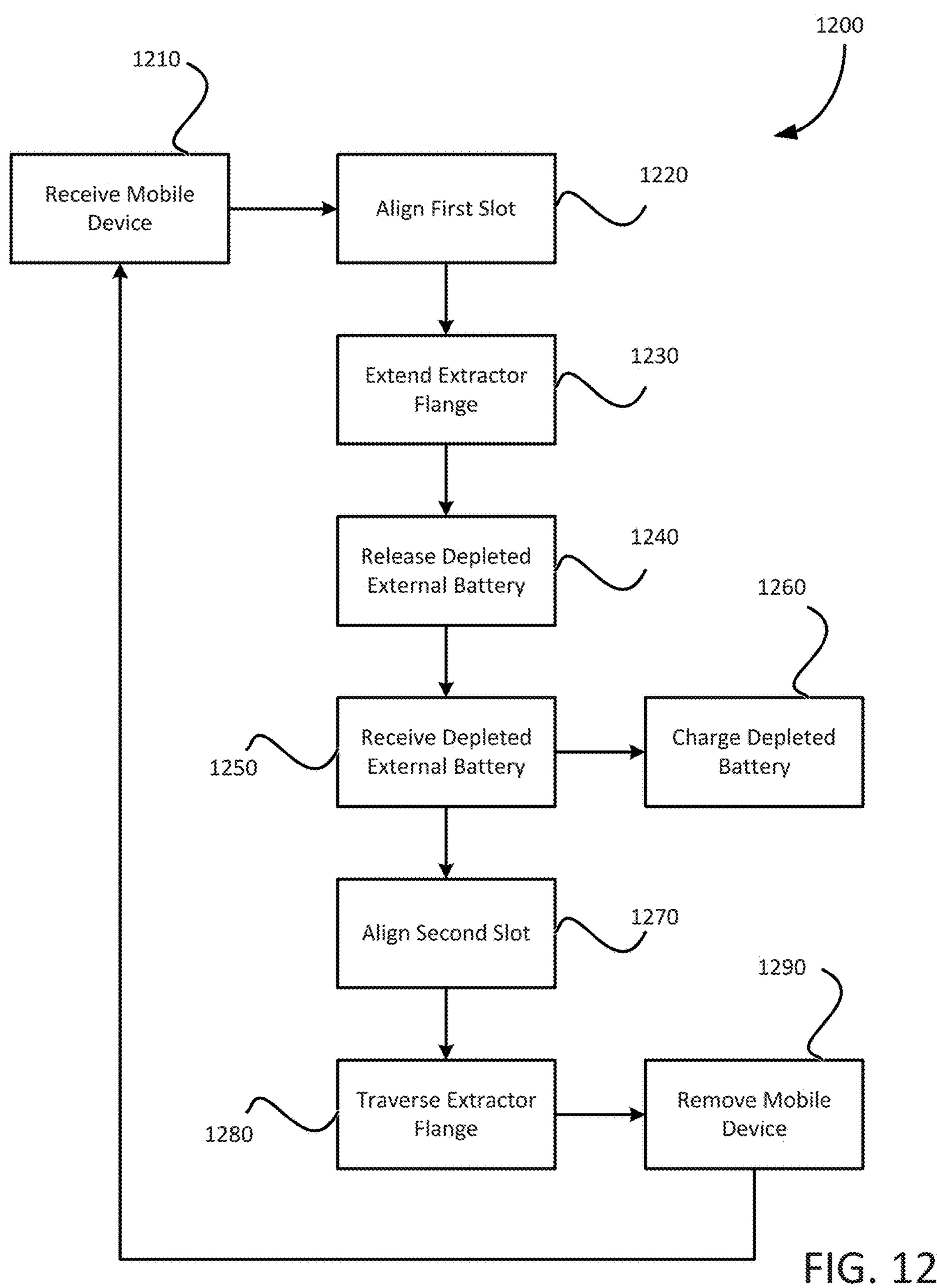
FIG. 12 is a flowchart of an example method, according to embodiments of the present disclosure.

FIG. 12 is a flowchart of an example method 1200 for performing automated battery swapping, according to embodiments of the present disclosure. Method 1200 begins at block 1210 when a mobile device 130 is received into the receiving assembly 112 of the battery swapping system 100. The mobile device 130 includes or is attached to a battery housing attachment 120 that includes a depleted external battery 150 that a user wishes to exchange for a charged external battery 150 held by the system 100. In various embodiments, sensors included in the receiving assembly 112 detect the presence of the mobile device 130, and alert a controller 260 for the system 100 to initiate a battery swapping process for the user.

At block 1220, in response to detecting the mobile device 130 at block 1210, the controller 260 aligns a first slot 420 of a plurality of slots in a battery carrier unit 410 with an aperture 145 of a battery swapping system 100. In various embodiments, the controller signals the first traversing stage 510 to move forward or backward on an axis of travel to align the first slot 420 of the battery carrier unit 410 with the aperture 145.

The battery carrier unit 410 includes a plurality of slots 420 that can each hold one external battery 150. When the battery carrier unit 410 does not include any empty slots 420, method 1200 may conclude (e.g., signaling a user to manually remove a depleted battery 150 before re-attempting). When the battery carrier unit 410 includes an empty slot 420, but does not include any external batteries 150 that satisfy a minimum charge threshold, the controller 260 may signal the user that the battery swapping process may not be able to provide a replacement external battery 150 with higher charge than the current external battery 150; allowing the user the option to conclude method 1200 or proceed with method 1200. When the he battery carrier unit 410 includes at least one empty slot 420 (that does not presently hold an external battery 150) and at least one charged external battery 150, method 1200 proceeds with one of the empty slots 420 selected as the first slot 420 aligned with the aperture 145.

At block 1230, the controller 260 extends an extractor flange 620 connected to a second traversing stage 610 through the first slot 420 when aligned with the aperture 145. In various embodiments, the controller 260 signals the second traversing stage 610 to move upward or downward on an axis of travel to guide the charged external battery 150 through the aperture 145 and control the rate of travel into the battery carrier unit 410 once the external battery 150 is released (per block 1240).

In some embodiments, block 1230 may be omitted, and the depleted external battery 150 may be permitted to drop unaided from the battery housing attachment 120 through the aperture 145 into the selected empty slot 420.

At block 1240, the battery swapping system 100 releases the depleted external battery 150 from the battery housing attachment 120. In some embodiments, the controller 260 actuates solenoid heads 710 to engage locking mechanisms of the battery housing attachment 120 to release the external battery 150 therefrom.

At block 1250, the battery carrier unit 410 receives the depleted external battery 150 from the battery housing attachment 120 of the mobile device 130 into the first slot 420 via the aperture 145. In various embodiments, receiving the depleted external battery 150 includes retracting the extractor flange 620 through the first slot 420 with the depleted external battery 150 affixed with the extractor flange 620 and securing the depleted external battery 150 into the first slot 420. In various embodiments, the depleted external battery 150 is affixed to the extractor flange 620 by gravity (e.g., resting on the extractor flange) and guiding walls in the system 100, while in some embodiments, the extractor flange 620 includes a magnetic tip that magnetically secures the external battery 150 to the extractor flange 620.

At block 1260, the battery swapping system 100 charges the depleted battery 150 received per block 1250. In various embodiments, the battery swapping system 100 may initiate charging operations as soon as the depleted battery 150 is received, or wait for the swapping process to conclude before charging the depleted battery 150 (e.g., after block 1290, paused when performing any of blocks 1210-1250 and 1270-1290). In various embodiments, the depleted battery 150 received per block 1250 may be charged in parallel or in series with other batteries held by the battery carrier unit 410.

At block 1270, the controller 260 aligns a second slot 420 of the plurality of slots 420 with the aperture, wherein the second slot 420 holds a charged external battery 150. In various embodiments, the controller 260 signals the first traversing stage 510 to move forward or backward on an axis of travel to align the second slot 420 with the aperture 145. In various embodiments, the controller 260 selects the second slot 420 from the plurality of slots 420 based on a relative charge state of the at least one charged external battery held in the plurality of slots (e.g., the battery with the highest charge, longest expected battery life, etc.) or a relative time of holding in the battery carrier unit 410 of the at least one charged external battery 150 held in the plurality of slots 420 (e.g., the charged battery that has been held the longest by the system 100).

At block 1280, the controller 260 traverses an extractor flange 620 through the second slot 420 to push the charged external battery 150 out of the second slot 420, through the aperture 145, and into the battery housing attachment 120 of the mobile device 130. In various embodiments, the controller 260 signals the second traversing stage 610 to move upward or downward on an axis of travel to push the charged external battery 150 through the aperture 145, and then to return to a rest position for the extractor flange. In various embodiments, the system 100 may leave the extractor flange 620 in the extended position, as the second slot is now unoccupied, and is positioned to receive a next battery when a new instance of method 1200 is performed; allowing block 1270 to operate as block 1220 in anticipation of a subsequent performance of method 1200.

At block 1290, the user removed the mobile device 130 with the now-charged external battery 150 secured in the battery housing attachment 120. Method 1200 may conclude after block 1290, or repeat in response to a subsequent mobile device 130 being received by the system 100 (e.g., per a subsequent instance of block 1210).

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

I claim:

1. A battery swapping system for a mobile device on which a battery housing attachment is disposed and secures an external battery to the mobile device, the system comprising:

a housing, including an aperture that allows passage between an outside of the housing and an inside of the housing;

a receiving assembly, configured to position the battery housing attachment at a predefined distance relative to the aperture when the mobile device is inserted into the receiving assembly;

a battery carrier unit, disposed in the inside of the housing, including a plurality of slots configured to hold a corresponding plurality of external batteries, and a terminal panel configured to pass an electric charge from an electrical power supply to at least one external battery of a plurality of external batteries held within the plurality of slots;

a first traversing stage configured to travel on a first axis and connected to the battery carrier unit to thereby align individual slots of the plurality of slots with the aperture;

a second traversing stage configured to travel on a second axis, perpendicular to the first axis, the second traversing stage including an extractor flange configured for insertion through an individual slot of the plurality of slots, wherein in a first position the extractor flange is out of contact with any external batteries and in a second position, at an opposite end of travel on the second axis relative to the first position, the extractor flange extends an affixed battery into contact with the battery housing attachment; and a controller, configured to signal the first traversing stage and the second traversing stage to:

align a first slot of the plurality of slots that does not presently hold any external batteries of the plurality of external batteries with the aperture when receiving a depleted external battery from the mobile device;

align a second slot of the plurality of slots that holds a charged external battery with the aperture; and traverse the extractor flange through the second slot to push the charged external battery out of the second slot, through the aperture, and into the battery housing attachment.

2. The system of claim 1, further comprising:

a first solenoid and a second solenoid configured to move between a first position and a second position, wherein in the first position the first solenoid and the second solenoid apply an inward force to corresponding ones of a first side arm of the receiving assembly and a second side arm of the receiving assembly that respectively push a first tab and a second tab of the external battery out of a first tab-lock and a second tab-lock of the battery housing attachment, and wherein in the second position the first solenoid and the second solenoid release the inward force from the first side arm and the second side arm to allow the tabs of the charged external battery to engage the first tab-lock and the second tab-lock when inserted into the battery housing attachment.

3. The system of claim 1, wherein the controller is further configured to, after aligning the first slot with the aperture, and before aligning the second slot with the aperture:

extend the extractor flange through the first slot;

release the depleted external battery from the battery housing attachment;

retract the extractor flange through the first slot with the depleted external battery affixed with the extractor flange; and secure the depleted external battery into the first slot.

4. The system of claim 1, wherein the controller is further configured to:

select the charged external battery from a plurality of charged external batteries held in the battery carrier unit based on one or more of:

relative charge states of the plurality of charged external batteries; and relative durations of holding of the plurality of charged external batteries in the battery carrier unit.

5. The system of claim 1, wherein each slot of the plurality of slots includes an first opening on a first side of the battery carrier unit that is larger than a second opening on a second side of the battery carrier unit, opposite to the first side, wherein the first side is closer to the aperture than the second side is, and a traversal hole running between the first opening and the second opening on a third side of the battery carrier unit perpendicular to the first side and the second side.

6. The system of claim 1, further comprising:

sensors configured to detect when a mobile device is received by the receiving assembly.

7. A method, comprising:

aligning a first slot of a plurality of slots in a battery carrier unit with an aperture of a battery swapping system, wherein the battery carrier unit holds at least one charged external battery in a corresponding at least one of the plurality of slots, wherein the first slot does not presently hold an external battery;

receiving a depleted external battery from a battery housing attachment of a mobile device into the first slot via the aperture;

aligning a second slot of the plurality of slots with the aperture, wherein the second slot holds a charged external battery; and traversing an extractor flange through the second slot to push the charged external battery out of the second slot, through the aperture, and into the battery housing attachment.

8. The method of claim 7, wherein the second slot is selected from the plurality of slots based on one or more of:

a relative charge state of the at least one charged external battery held in the plurality of slots; and a relative time of holding in the battery carrier unit of the at least one charged external battery held in the plurality of slots.

9. The method of claim 7, further comprising:

extending the extractor flange through the first slot when aligned with the aperture;

releasing the depleted external battery from the battery housing attachment; and wherein receiving the depleted external battery further comprises:

retracting the extractor flange through the first slot with the depleted external battery affixed with the extractor flange; and securing the depleted external battery into the first slot.

10. The method of claim 9, wherein releasing the depleted external battery includes actuating solenoid heads to engage locking mechanisms of the battery housing attachment.

11. The method of claim 7, wherein the first slot is aligned with the aperture in response to receiving the mobile device in a receiving assembly of the system.

12. The method of claim 7, further comprising:

charging the depleted external battery after receiving the depleted external battery into the battery carrier unit.

13. A non-transitory computer readable storage medium including instructions that when executed by a processor of a battery swapping system that includes a battery carrier unit with a plurality of slots that is movable via a first traversing stage relative to an aperture in the battery swapping system and includes a second traversing stage cause the battery swapping system to perform operations, the operations comprising:

aligning a first slot of the plurality of slots with the aperture via the first traversing stage, wherein the battery carrier unit holds at least one charged external battery in a corresponding at least one of the plurality of slots, wherein the first slot does not presently hold an external battery;

receiving, into the first slot via the aperture, a depleted external battery from a battery housing attachment of a mobile device received by the battery swapping system;

aligning, via the first traversing stage, a second slot of the plurality of slots with the aperture, wherein the second slot holds a charged external battery; and traversing, via the second traversing stage, an extractor flange through the second slot to push the charged external battery out of the second slot, through the aperture, and into the battery housing attachment.

14. The non-transitory computer readable storage medium of claim 13, wherein the second slot is selected from the plurality of slots based on one or more of:

a relative charge state of the at least one charged external battery held in the plurality of slots; and a relative time of holding in the battery carrier unit of the at least one charged external battery held in the plurality of slots.

15. The non-transitory computer readable storage medium of claim 13, the operations further comprising:

extending the extractor flange through the first slot when aligned with the aperture;

releasing the depleted external battery from the battery housing attachment; and wherein receiving the depleted external battery further comprises:

retracting the extractor flange through the first slot with the depleted external battery affixed with the extractor flange; and securing the depleted external battery into the first slot.

* * * * *